May 30, 1967
R. B. CLEVERLY
3,322,591
MACHINE AND METHOD FOR AUTOMATICALLY FABRICATING MULTIPLE
UNIT ASSEMBLIES OF INDIVIDUAL PIECES
Filed April 17, 1963
15 Sheets-Sheet 1
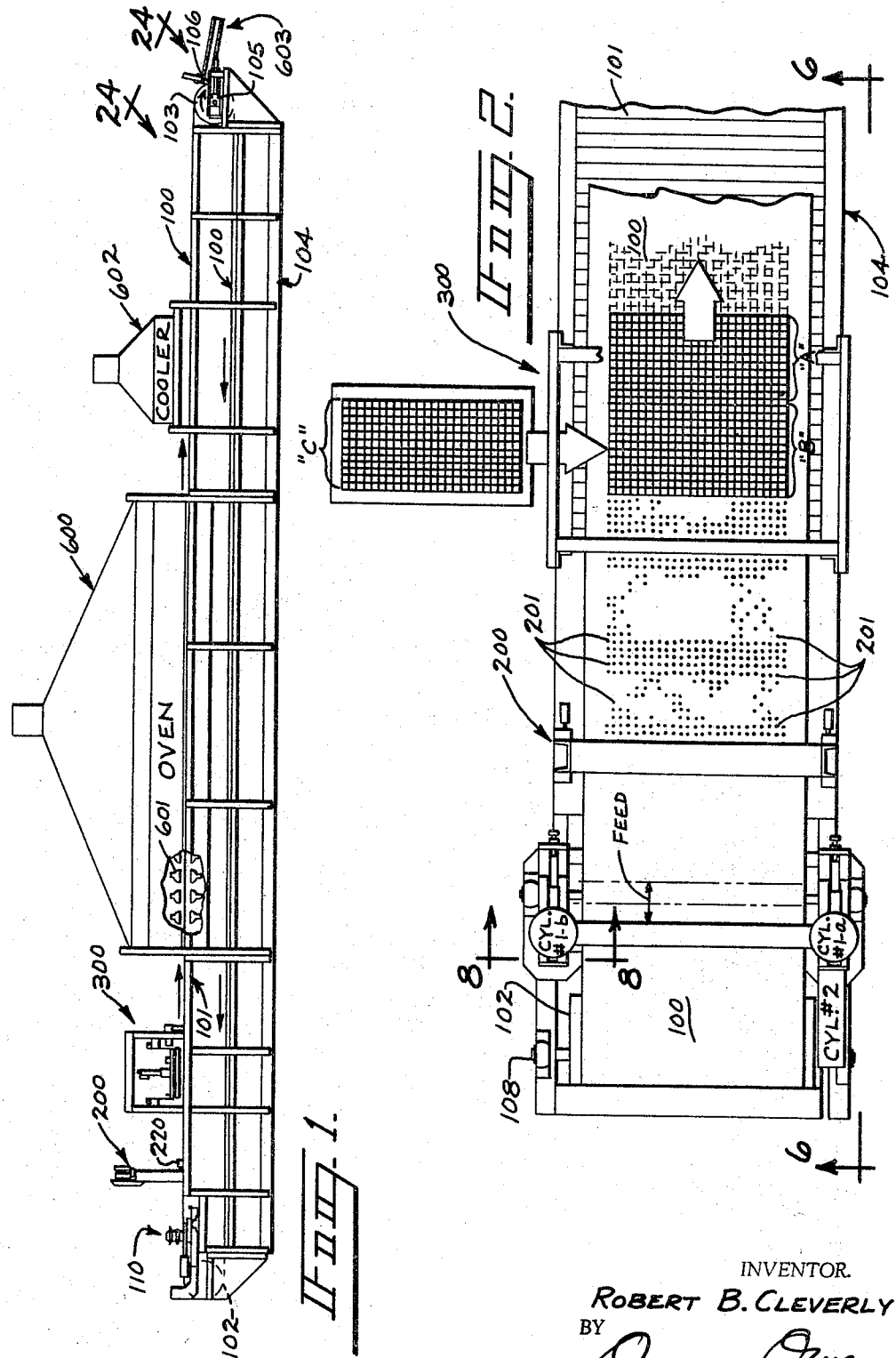
INVENTOR.
ROBERT B. CLEVERLY
BY
Owen + Owen
ATTORNEYS

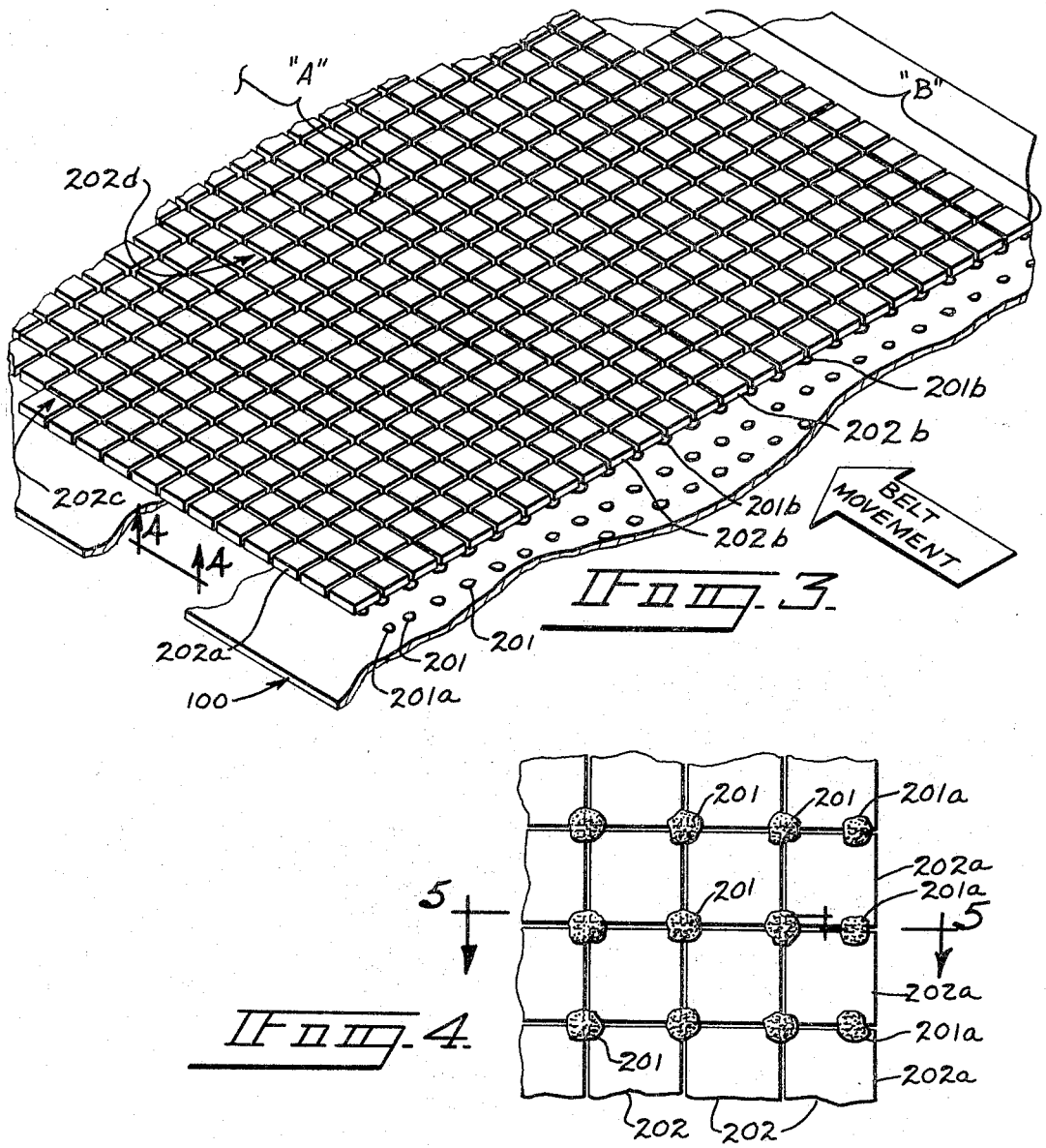

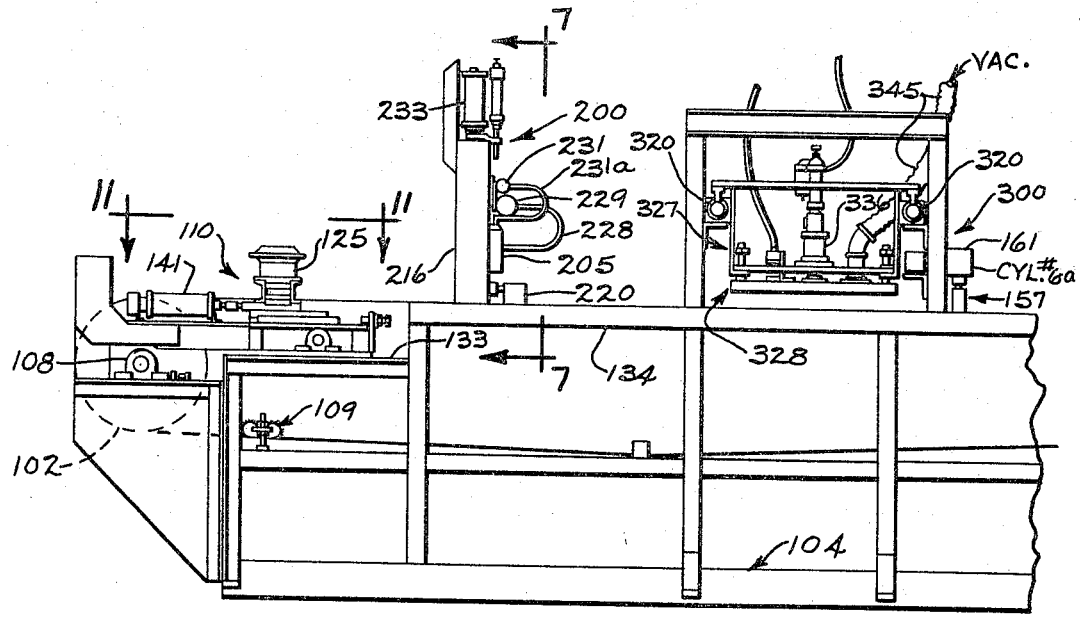
Fig. 6.
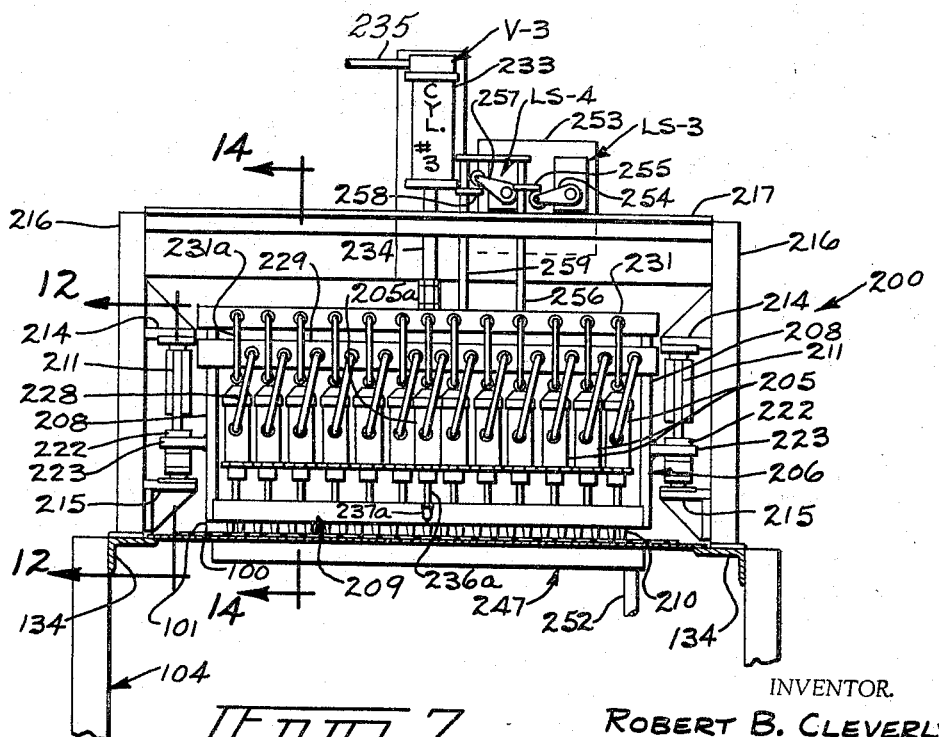
Fig. 7.
INVENTOR.
ROBERT B. CLEVERLY
BY
ATTORNEYS

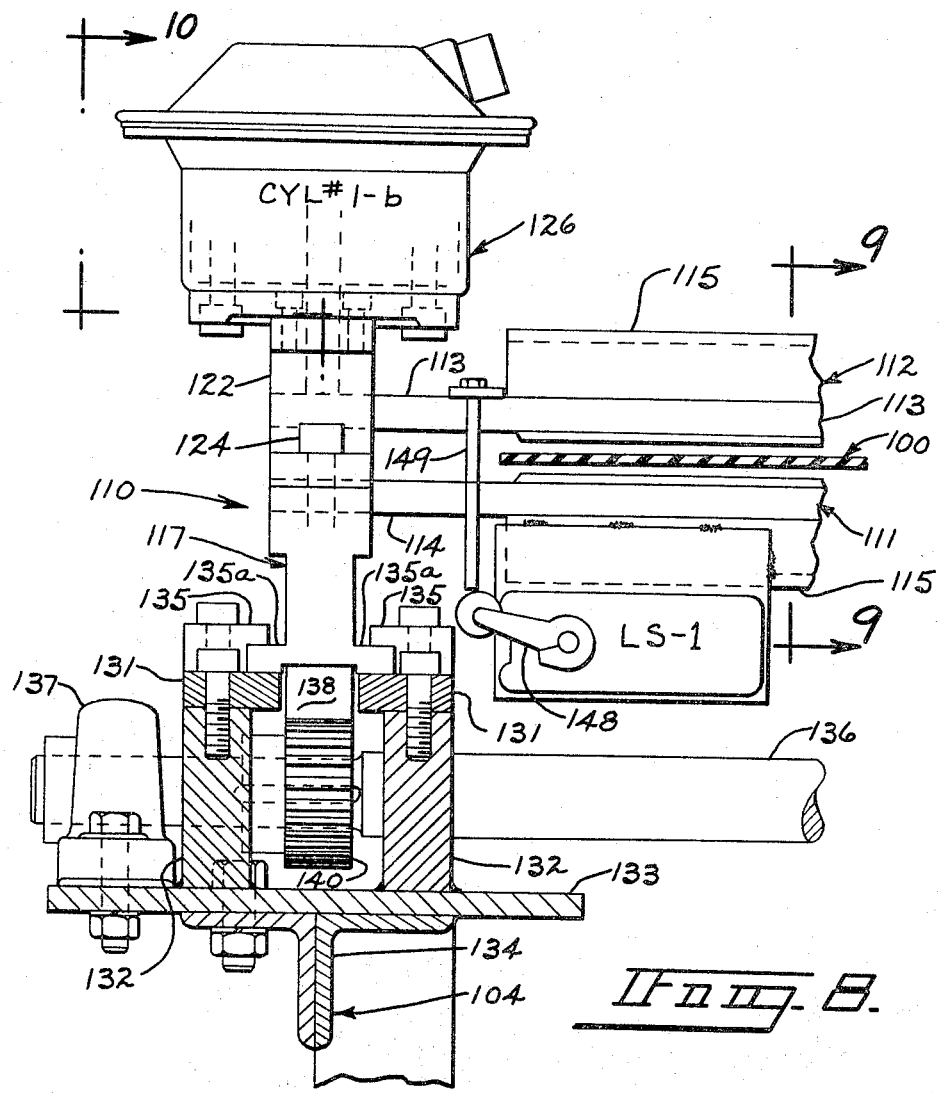
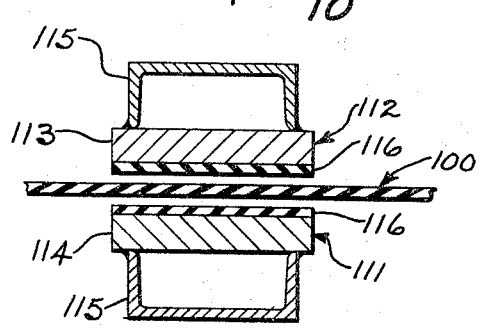

May 30, 1967  R. B. CLEVERLY  3,322,591
MACHINE AND METHOD FOR AUTOMATICALLY FABRICATING MULTIPLE
UNIT ASSEMBLIES OF INDIVIDUAL PIECES
Filed April 17, 1963  15 Sheets-Sheet 5

INVENTOR.
ROBERT B. CLEVERLY
BY
Owen & Owen
ATTORNEYS

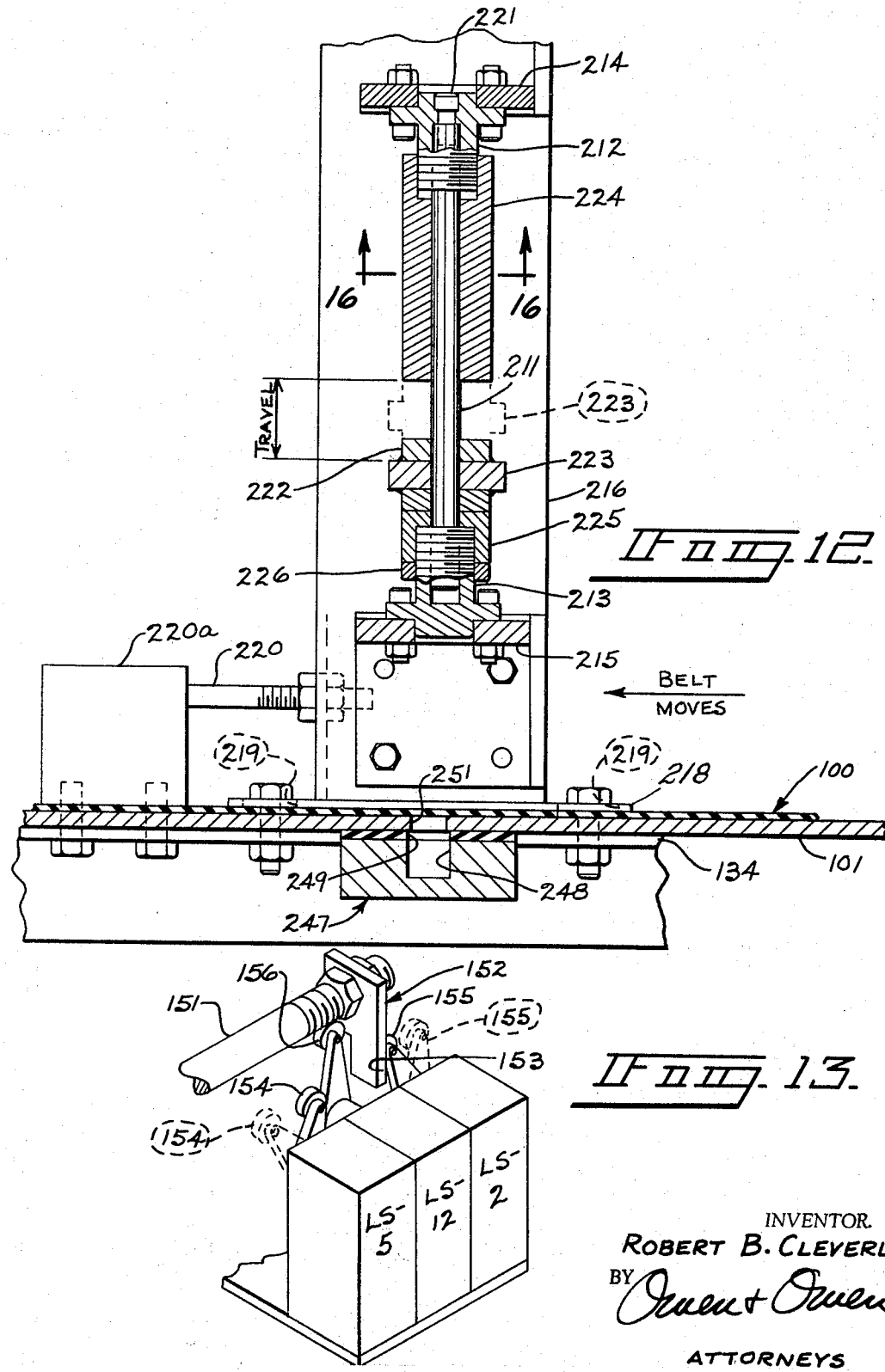

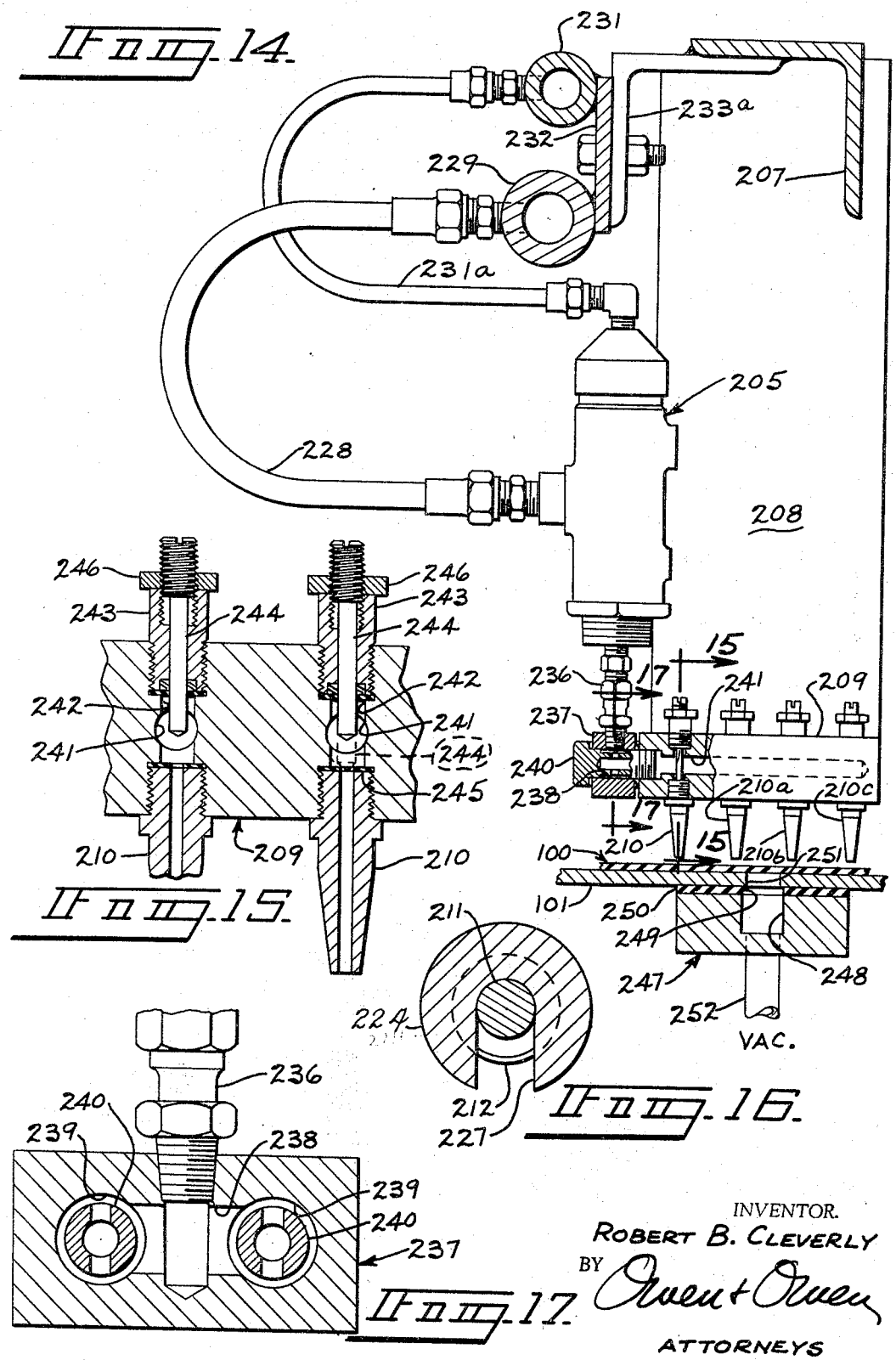

May 30, 1967  R. B. CLEVERLY  3,322,591
MACHINE AND METHOD FOR AUTOMATICALLY FABRICATING MULTIPLE
UNIT ASSEMBLIES OF INDIVIDUAL PIECES
Filed April 17, 1963  15 Sheets-Sheet 8
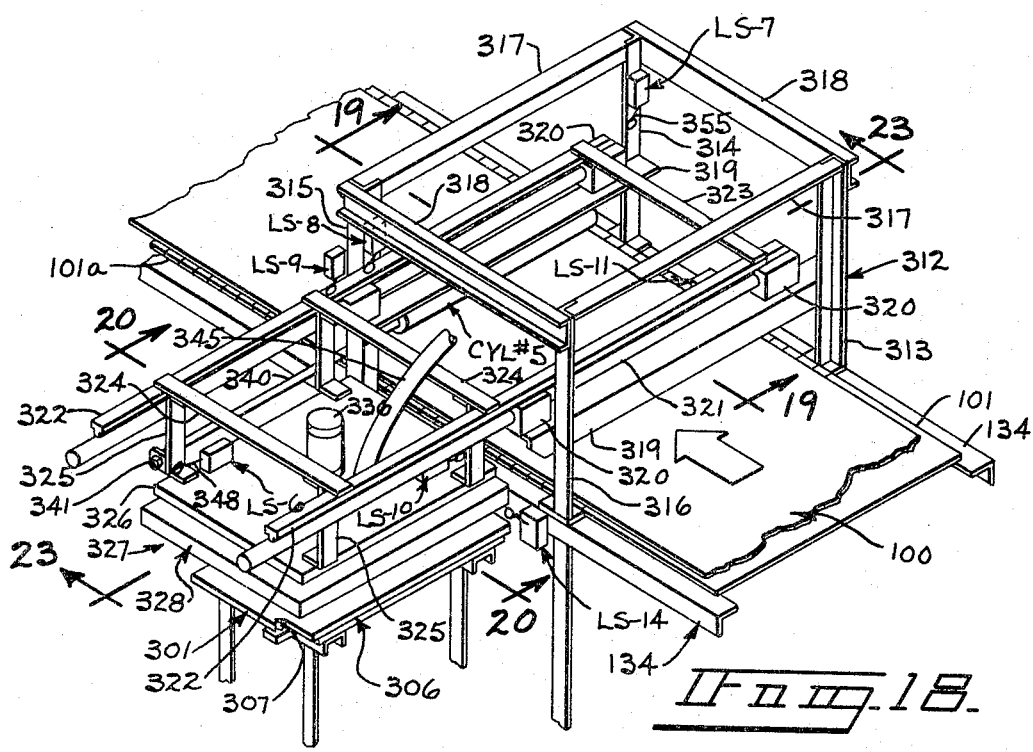
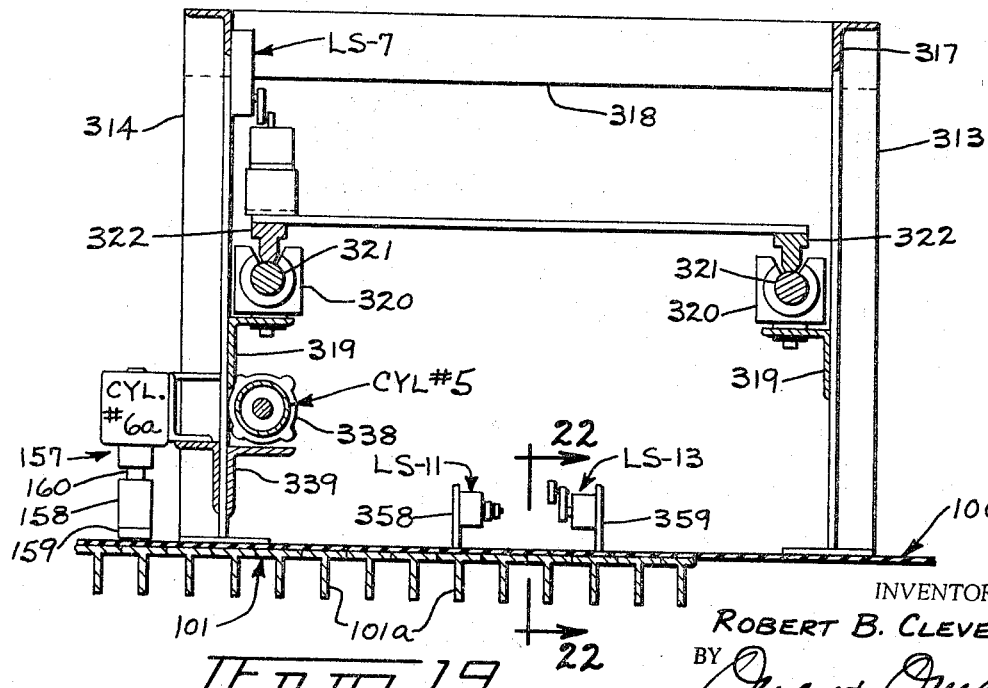
INVENTOR.
ROBERT B. CLEVERLY
BY 
ATTORNEYS

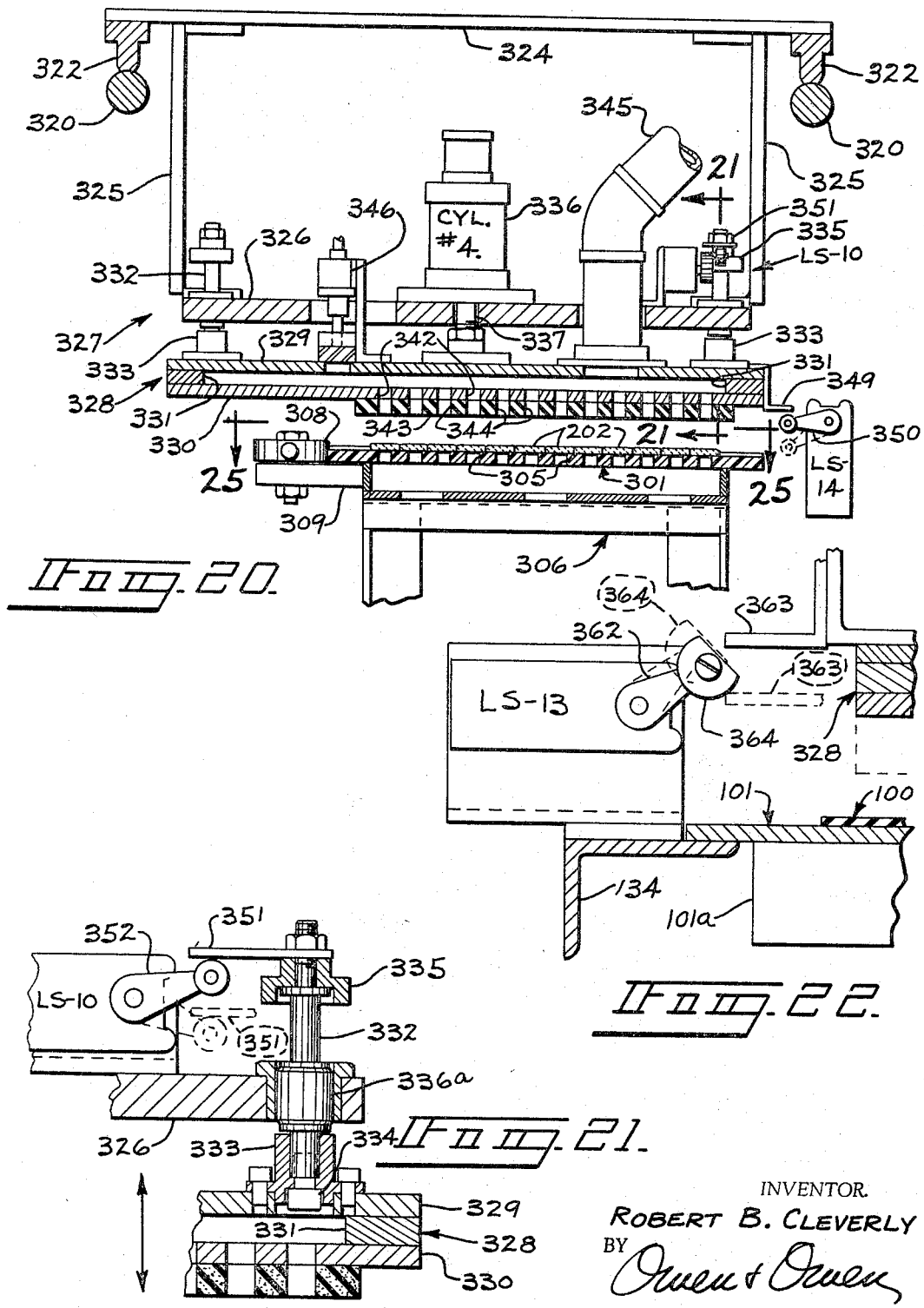

May 30, 1967  R. B. CLEVERLY  3,322,591
MACHINE AND METHOD FOR AUTOMATICALLY FABRICATING MULTIPLE
UNIT ASSEMBLIES OF INDIVIDUAL PIECES
Filed April 17, 1963  15 Sheets-Sheet 10
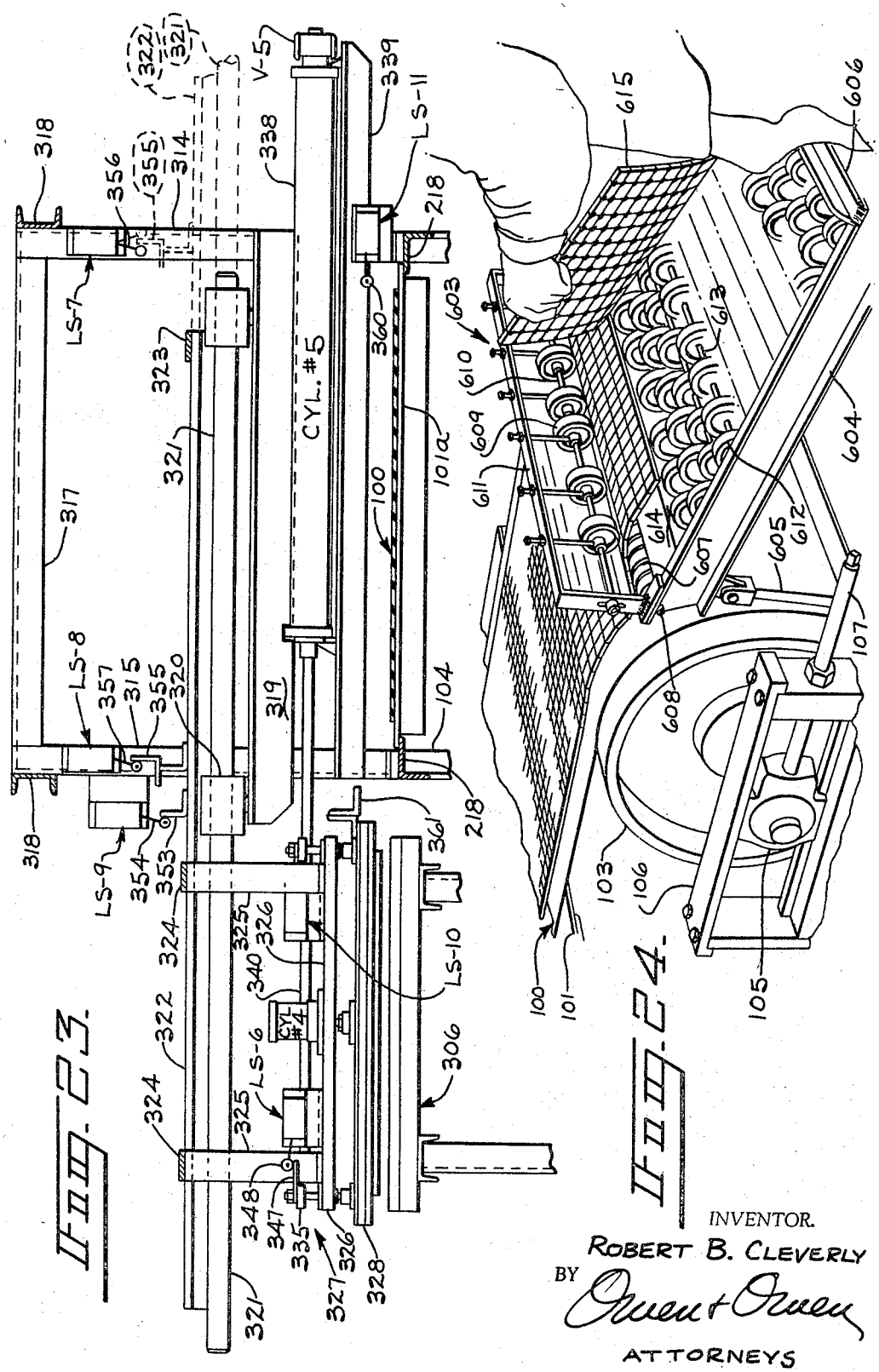
INVENTOR.
ROBERT B. CLEVERLY
BY
ATTORNEYS

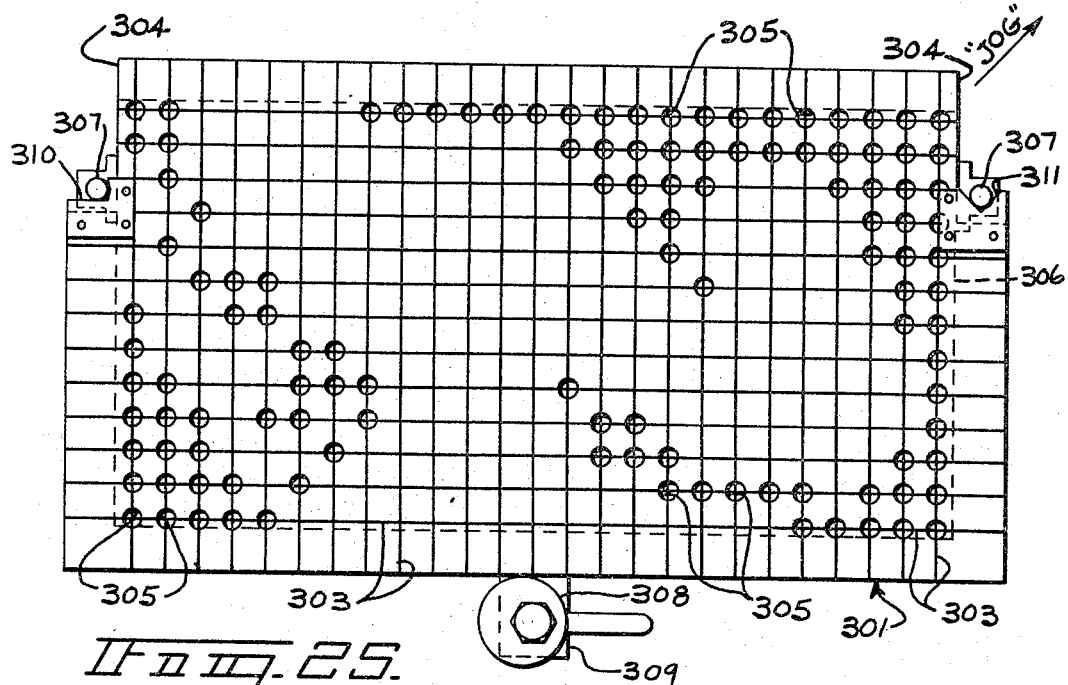
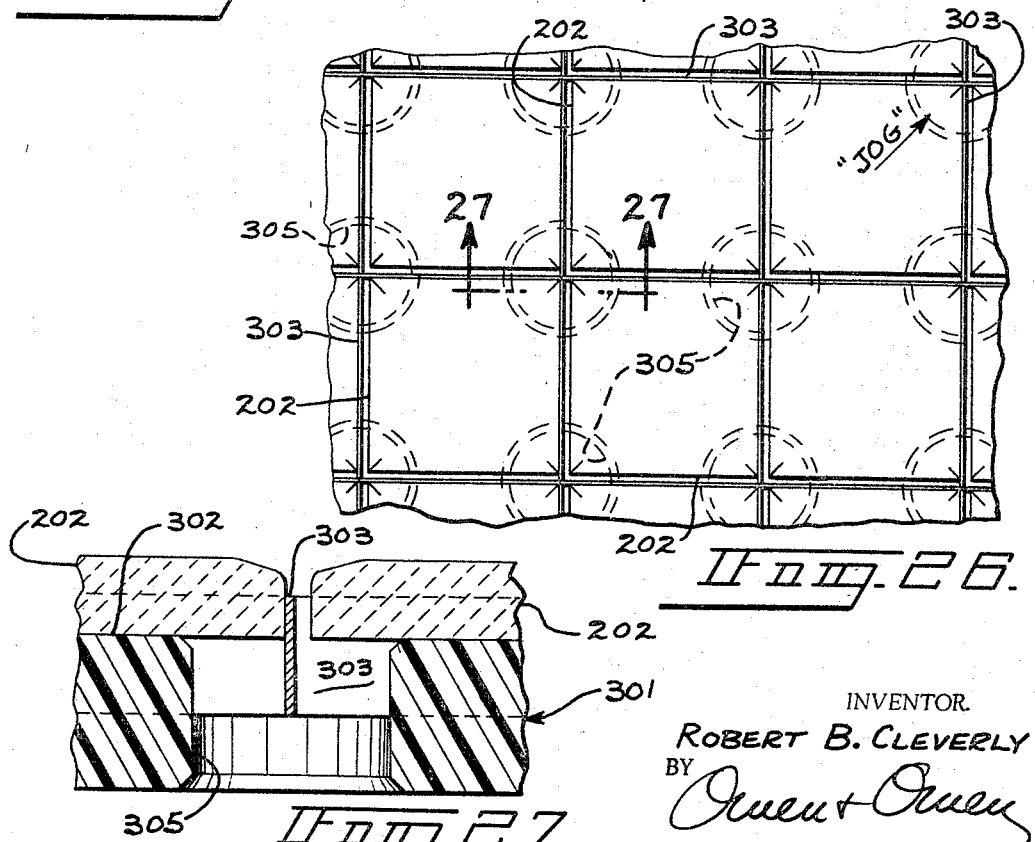

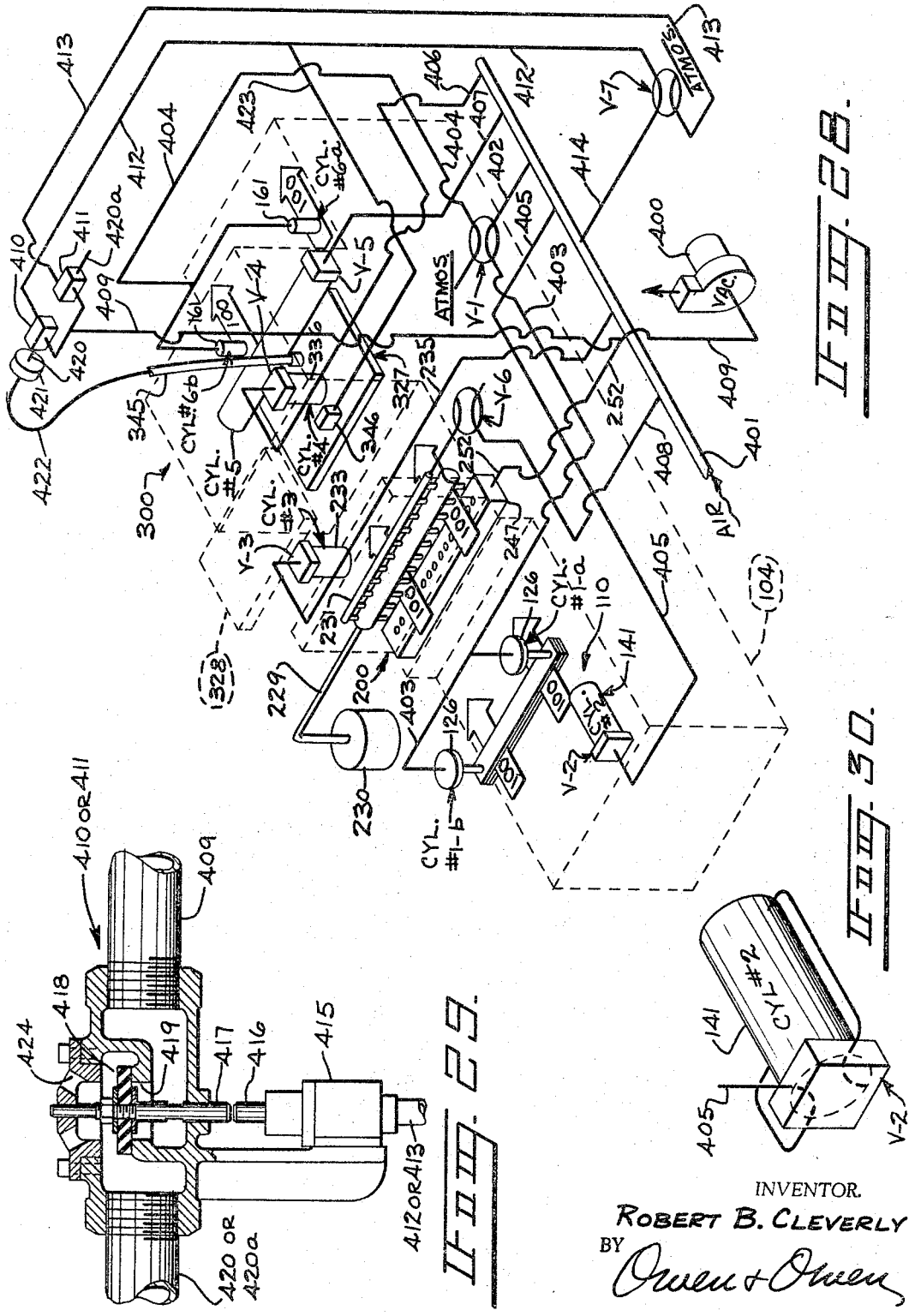

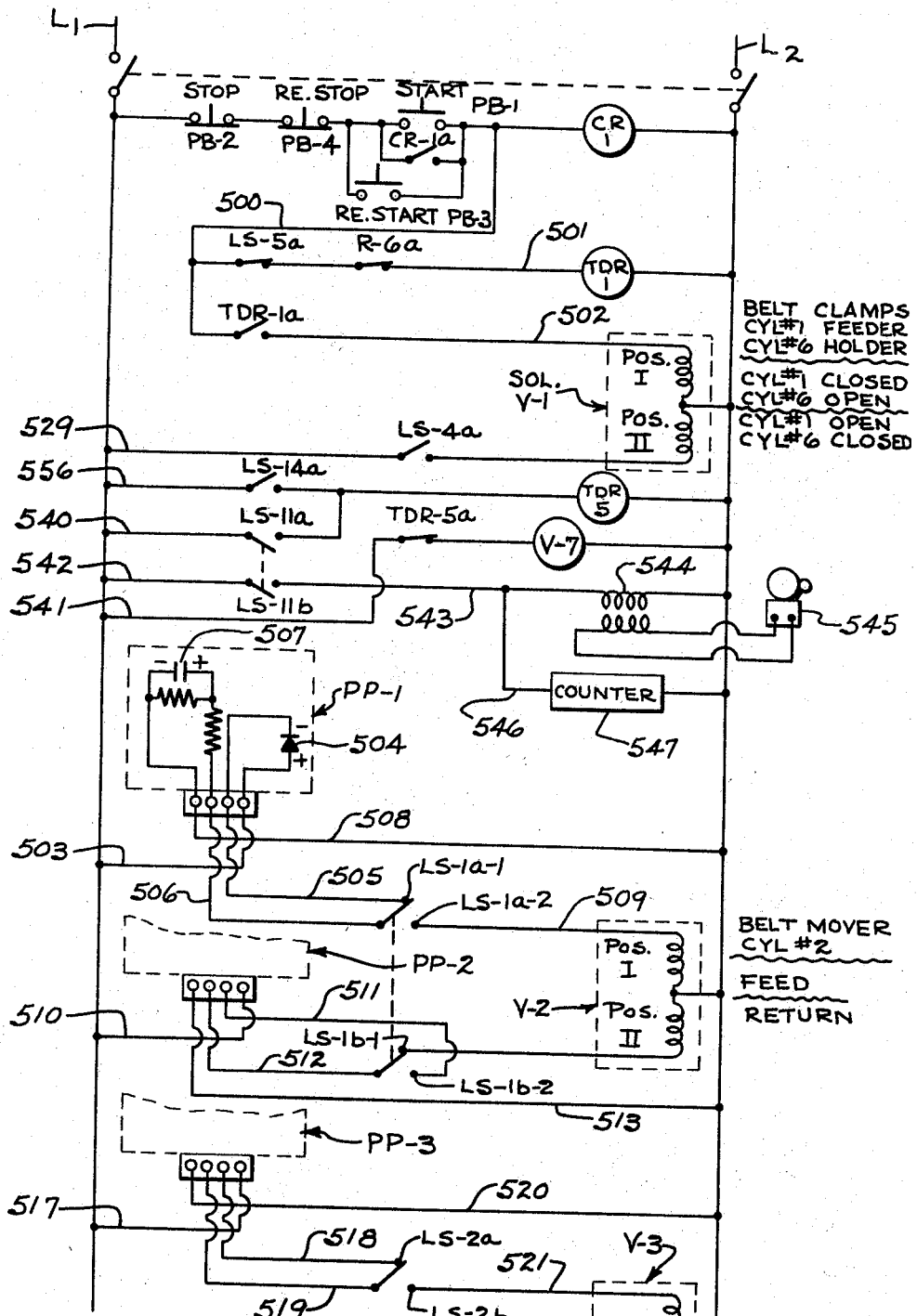
Fig. 31.a

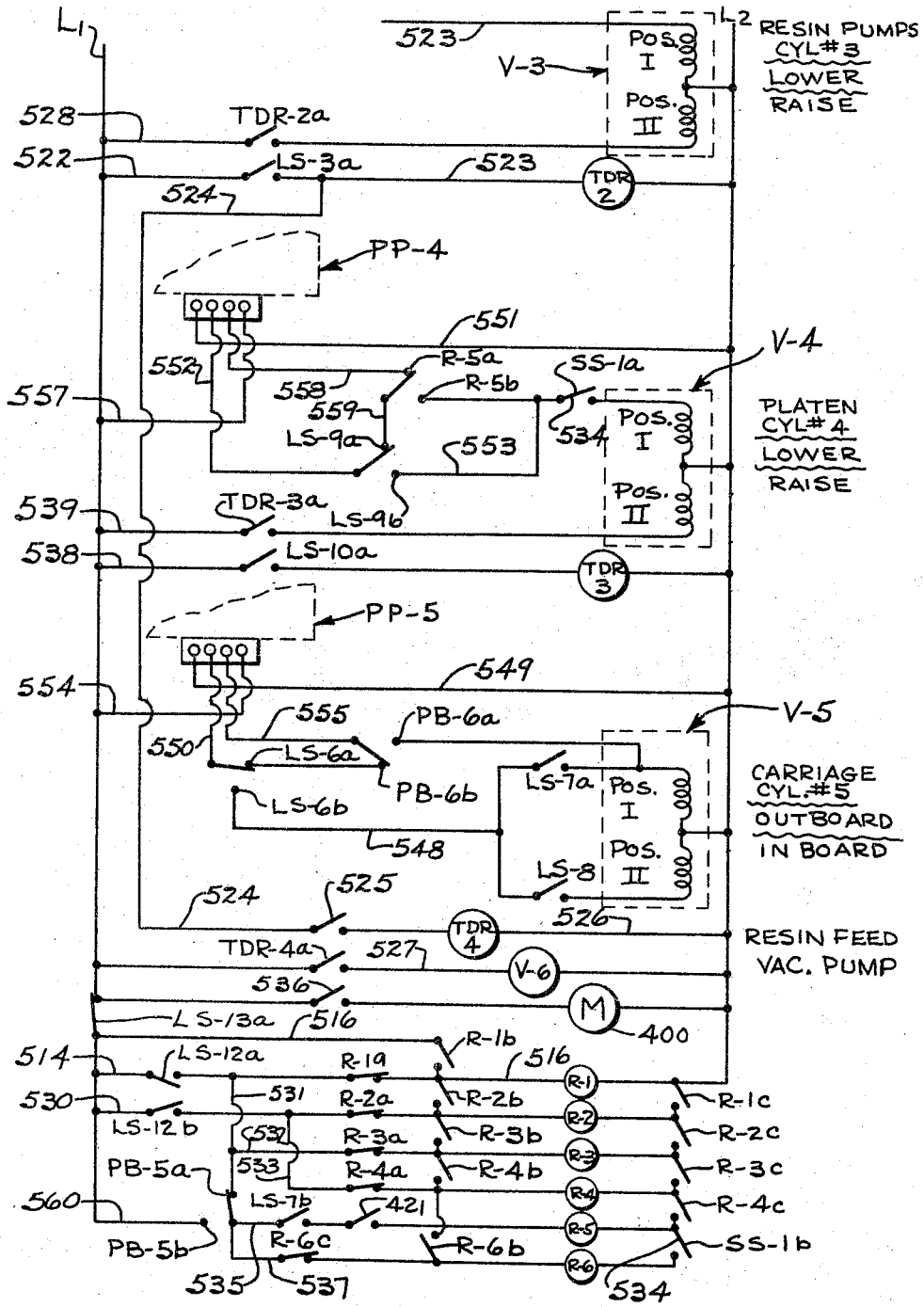

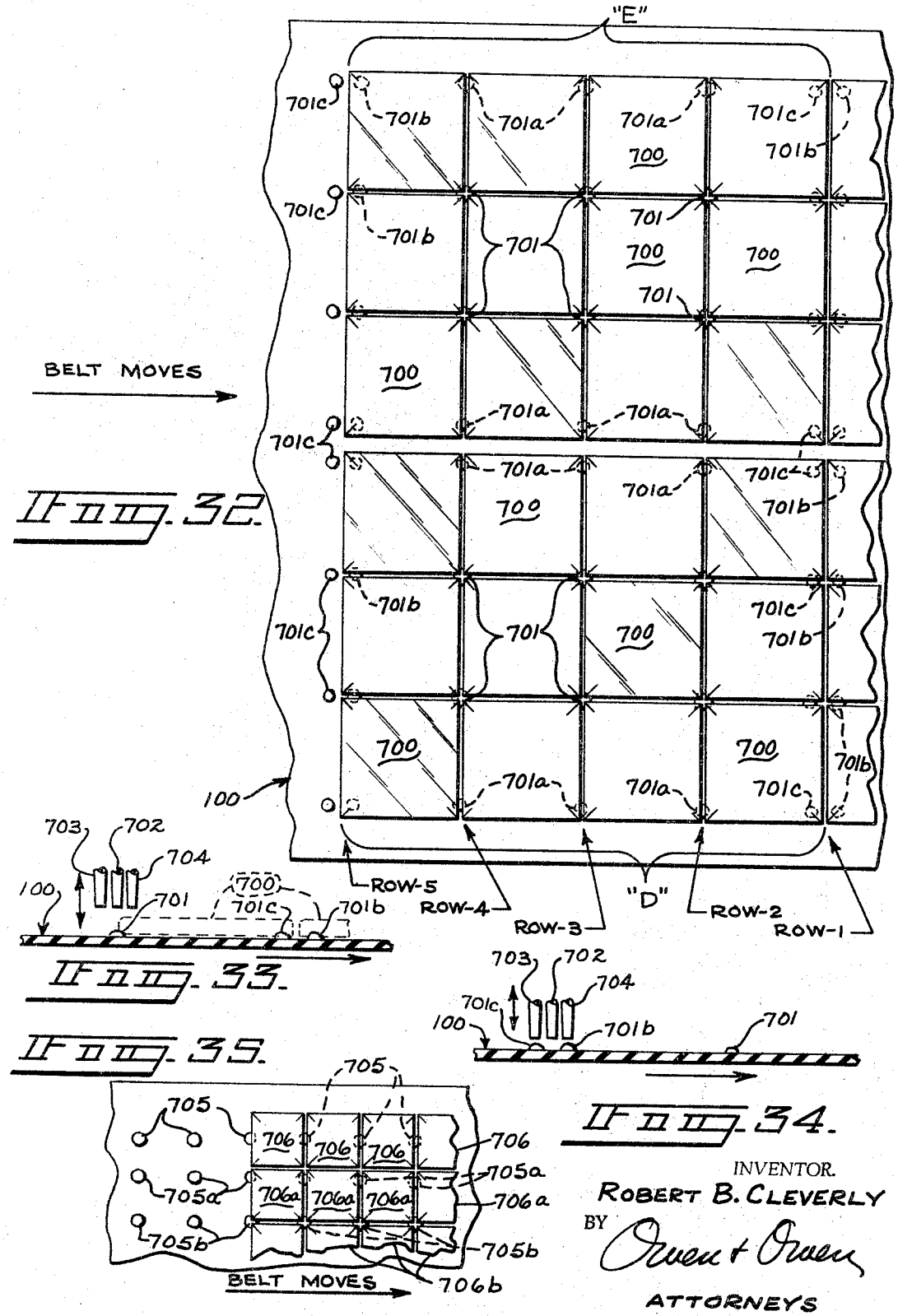

3,322,591
MACHINE AND METHOD FOR AUTOMATICALLY FABRICATING MULTIPLE UNIT ASSEMBLIES OF INDIVIDUAL PIECES
Robert B. Cleverly, Zanesville, Ohio, assignor to The Mosaic Tile Company, Cleveland, Ohio, a corporation of Ohio
Filed Apr. 17, 1963, Ser. No. 273,665
The portion of the term of the patent subsequent to May 25, 1982, has been disclaimed
17 Claims. (Cl. 156—297)

This invention relates to a machine and method for the automatic fabrication of multiple unit assemblies of ceramic tile and the like and more particularly to a machine for fabricating assemblies such as those which are the subject of Macdonald et al. Patent No. 3,041,785 issued July 3, 1962.

Although both the machine and the method embodying the invention have utility for the manufacture of assemblies of multiple units of materials other than ceramic tile, the following specification will be devoted to the description of the machine and method for the fabrication of multiple unit assemblies of modular size ceramic tiles, being specifically illustrated as designed and operated for the continuous fabrication of an assembly of 1" x 1" tiles in a sheet two feet wide and of any desired length. As the description progresses, it will from time to time, contain explanations of how various parts of the machine may be changed in order to fabricate multiple unit assemblies of individual identical pieces, such as ceramic tiles, in different unit sizes for example, 1" x 2", 2" x 2", 4" x 4", etc. The method of the invention also contemplates the fabrication of multiple unit assemblies comprising individual pieces in various or several sizes assembled together to form complementary patterns such as, for example, an assembly comprising a center unit 2" x 2" surrounded on all four sides by 1" x 1" units. Other combinations including 1" x 2" units, ½" x 1" units, triangular units, for example, a right triangular unit having one inch sides, and other similar and different units which may be assembled to form complete patterns, may also be fabricated into multiple unit assemblies according to the method of the invention.

It has been conventional in the ceramic tile art for many years to form such multiple unit assemblies of individual pieces of tile by adhering them to a backing sheet or a facing sheet in order to provide the tile setter with units of multiple pieces to facilitate and expedite the setting of floors and walls. This has been particularly effective when a multiple unit pattern of various size pieces of tile and, often, various colors, is to be set. More recently, individual pieces of ceramic tiles of various sizes have been bonded to an open mesh work such as a scrim or grid of textile or other strands to form a multiple unit assembly.

Each of these multiple unit assemblies of ceramic tiles has suffered from one or more shortcomings such as an insufficient exposure of the rear face of the tile pieces for adhesion by the mastic or setting bed, too great a degree of flexibility of the multiple unit assembly to enable it to be readily handled by a tile setter, the necessity for removing the assembly sheet, such as a sheet of paper often attached to the front faces of the tiles, in order to view the tiles after they are placed in a setting bed, the inability of the sheet of paper or open fabric to retain the tiles both against movement away from each other and against movement towards each other, the inability of the tile assembly means, such as a resin impregnated open mesh adhered to the back pieces of the tiles, to prevent the tile pieces from coming into contact with each other during shipping, handling and laying, and thus cracking or chipping the edges of the tile pieces, and insufficient strength in the assembly means such as the sheet of paper to retain the tiles in sufficient number to permit more than a relatively small multiple unit assembly, said 1' x 2' or two feet square, to be handled as a unit.

All the foregoing shortcomings of previous multiple unit assemblies are overcome by the multiple unit assembly of the mentioned patent in accordance with which the individual pieces or units of ceramic tiles are retained in their desired pattern by small discrete masses of set-up synthetic resin adhered directly to edge portions of the back surfaces of the tile units and to portions of the edge surfaces thereof which are contiguous to the portions of the back surfaces. The resin in the masses according to the mentioned patent also intrudes into the desired space between the edge surfaces of the ceramic tile units bonding directly to these surfaces and forming solid "bridges" between the individual units. The resin masses retain the individual units against shifting either toward or away from each other and give to the multiple unit assembly a unitary integrity, yet sufficient flexibility to permit laying the assembly upon a less than perfectly planar surface and, indeed, providing for sufficient "hinging" between adjacent units so that a substantial length of the assembly can be rolled up after manufacture, shipped in a roll, and unrolled on the floor where it is to be laid after the floor has been prepared.

The multiple unit ceramic tile assemblies of the mentioned Macdonald et al. patent possess yet another important advantage over multiple unit assemblies employing sheet-like materials, whether solid or open, and whether adhered to the front faces or the rear faces, to which the tile pieces adhered to form the assemblies. Although individual pieces of tile are fabricated carefully in an effort to make them all of the same thickness, manufacturing tolerances result in variations in the thicknesses of the tile pieces so that if all the tiles are adhered, for example, at their back faces to a sheet of paper, to an open mesh or scrim type fabric or other similar sheet-like material, the front faces of the tile pieces do not all lie in the same plane. Conversely, if the sheet-like material is adhered to the front faces of the tile pieces, the back faces do not lie in the same plane.

Furthermore, even if the tile pieces are assembled with the front faces lying on a plane and the sheet-like backing is then adhered to either the front or back faces, the sheet-like backing possesses insufficient strength and rigidity to retain the tiles with their front faces all lying in the same plane so that when the tile assemblies are laid on a floor or wall, the tiles shift and all of their back faces usually wind up in the same plane with their front faces in staggered planes, making the surface of the tile floor or wall uneven. Because of the grout lines which customarily extend between adjacent pieces of ceramic tile, the human eye readily perceives discrepancies in the plane of the front faces and the uniformity of the pattern is destroyed.

In sharp and important contrast, a multiple unit assembly according to the Macdonald patent, may be assembled with the front faces of the tile pieces placed upon a plane or surface and the resinous masses of adhesive deposited upon their rear surfaces and then the bottoms of the resinous masses all formed to lie in a common plane parallel to the plane of the front faces so that the entire assembly has a flat front surface delineated by the front faces of the tile pieces, and a flat back surface delineated by the bottoms of the resinous masses. After the resinous masses are set up, and when the tile assembly is placed upon a flat surface such as a floor, the individual resinous masses act as "pedestals" to support the thinner tile pieces in a relatively elevated position, and to maintain the front faces of all the tiles in a single plane.

It is therefore the principal object of the instant invention to provide a machine and a method for the fabrication of multiple unit assemblies of modular size pieces, for example, of ceramic tile, the tile pieces being handled in modular groups, say 1' x 2' or larger and, where desired, being continuously assembled with similar groups to form a continuous length of fixed width, such as two feet.

It is yet another object of the instant invention to provide a machine for the assembly of modular sized units, for example of ceramic tile, which machine can readily be modified for the fabrication of multiple unit assemblies of individual pieces of different modular sizes.

It is yet another and more specific object of the instant invention to provide a machine and a method designed particularly for the fabrication of multiple unit tile assemblies according to the teachings of the mentioned Macdonald Patent 3,041,785, and according to the teachings of Macdonald et al. application Ser. No. 85,367, filed Jan. 27, 1961, now U.S. Patent No. 3,185,748.

More specific objects and advantages of a machine and a method embodying the invention will be better understood from the specification which follows and from the drawings in which:

FIG. 1 is a side view in elevation and on a very small scale of a machine for the fabrication of multiple unit assemblies according to the invention upon which machine the method of the invention readily may be carried out;

FIG. 2 is a fragmentary plan view of the left end portion of the machine shown in FIG. 1 and illustrating how groups of units are successively placed upon an intermittently moved assembly belt for the continuous production of multiple unit assemblies according to the invention;

FIG. 3 is a fragmentary isometric view of a portion of a continuous length of assembled ceramic tile units, each unit measuring 1" x 1" and fabricated in a web two feet wide upon the machine illustrated in FIGS. 1 and 2 and according to the method of the invention;

FIG. 4 is a fragmentary view on an enlarged scale taken approximately from the position indicated by the reference line 4—4 of FIG. 3 and illustrating how each of the units of ceramic tile is attached to its neighbors according to United States Patent No. 3,041,785, upon the machine and according to the method of the instant invention;

FIG. 5 is a fragmentary, vertical sectional view taken along the line 5—5 of FIG. 4;

FIG. 6 is a fragmentary view in front elevation taken from the position indicated by the line 6—6 of FIG. 2;

FIG. 7 is a fragmentary, vertical sectional view taken from the position indicated by the line 7—7 of FIG. 6;

FIG. 8 is a greatly enlarged, fragmentary, vertical sectional view taken along the line 8—8 of FIG. 2;

FIG. 9 is a fragmentary detailed, vertical sectional view, taken along the line 9—9 of FIG. 8;

FIG. 12 is a fragmentary, vertical sectional view taken along the line 12—12 of FIG. 7 and shown on an enlarged scale;

FIG. 13 is a fragmentary view in perspective taken from the position indicated by the line 13—13 of FIG. 11;

FIG. 14 is a fragmentary, vertical sectional view, taken along the line 14—14 of FIG. 7, being also shown on an enlarged scale relative to FIG. 7;

FIG. 15 is a fragmentary, vertical sectional view, taken along the line 15—15 of FIG. 14 and shown on an enlarged scale;

FIG. 16 is an enlarged, horizontal sectional view taken along the line 16—16 of FIG. 12;

FIG. 17 is a fragmentary, vertical sectional view taken along the line 17—17 of FIG. 14, and shown on an enlarged scale;

FIG. 18 is an isometric skeletonized view of part of the framework of the machine shown in FIGS. 1 and 2, in particular that part of the machine wherein the groups of units of tile are transferred to the assembly belt as particularly illustrated in FIG. 2;

FIG. 19 is a fragmentary, vertical sectional view, taken approximately from the position indicated by the line 19—19 of FIG. 18;

FIG. 20 is a fragmentary, vertical sectional view, taken approximately from the position indicated by the line 20—20 of FIG. 18;

FIG. 21 is a fragmentary, vertical sectional view, taken along the line 21—21 of FIG. 20 and being shown on an enlarged scale;

FIG. 22 is a fragmentary, vertical sectional view, taken along the line 22—22 of FIG. 19 and being shown on an enlarged scale;

FIG. 23 is a fragmentary, vertical sectional view, taken along the line 23—23 of FIG. 18, also being shown on an enlarged scale;

FIG. 24 is a fragmentary isometric view of the discharge end of the machine, taken generally from the position indicated by the line 24—24 in FIG. 1, and shown on a greatly enlarged scale.

FIG. 25 is a plan view, illustrating an assembly board for a group of individual units, being taken substantially from the position indicated by the line 25—25 in FIG. 20 and being shown on an enlarged scale;

FIG. 26 is a fragmentary, horizontal plan view, of a number of individual tile units assembled in the assembly means illustrated in FIG. 25, the tile units being shown in FIG. 26 on a greatly enlarged scale relative to the scale of FIG. 25;

FIG. 27 is a fragmentary, vertical sectional view, taken along the line 27—27 of FIG. 26 and being shown on a still further enlarged scale;

FIG. 28 is a schematic, isometric, view showing the air pressure lines for actuating various operating cylinders and clamps and also diagrammatically showing the positions thereof relative to each other and relative to the assembly belt;

FIG. 29 is a detailed, fragmentary, partially sectional view of a vacuum line valve particularly useful in the air line system of FIG. 28;

FIG. 30 is a detailed diagrammatic view of a solenoid valve and a pneumatic cylinder of the type utilized in the pneumatic system shown in FIG. 28;

FIG. 31a is the first half of a schematic wiring diagram for the control and operation of a machine embodying the invention as illustrated in FIG. 1;

FIG. 31b is the second half of the said wiring diagram;

FIG. 32 is a fragmentary plan view of the assembly belt; illustrating the assembly of ceramic tile units of a type employed for walls, for example, measuring 4" x 4", into multiple unit assemblies according to the invention, each assembly consisting of 12 tiles, laid in a three by four group;

FIG. 33 is a fragmentary vertical sectional view illustrating one of the resin mass deposition cycles for the assemblies shown in FIG. 32;

FIG. 34 is a view similar to FIG. 33, illustrating another of the resin mass deposition cycles for the assemblies shown in FIG. 32; and FIG. 35 is a fragmentary plan view of the assembly belt, illustrating the deposition of resin masses for the production of multiple unit assemblies measuring only one unit wide.

General Description

Figure 10:
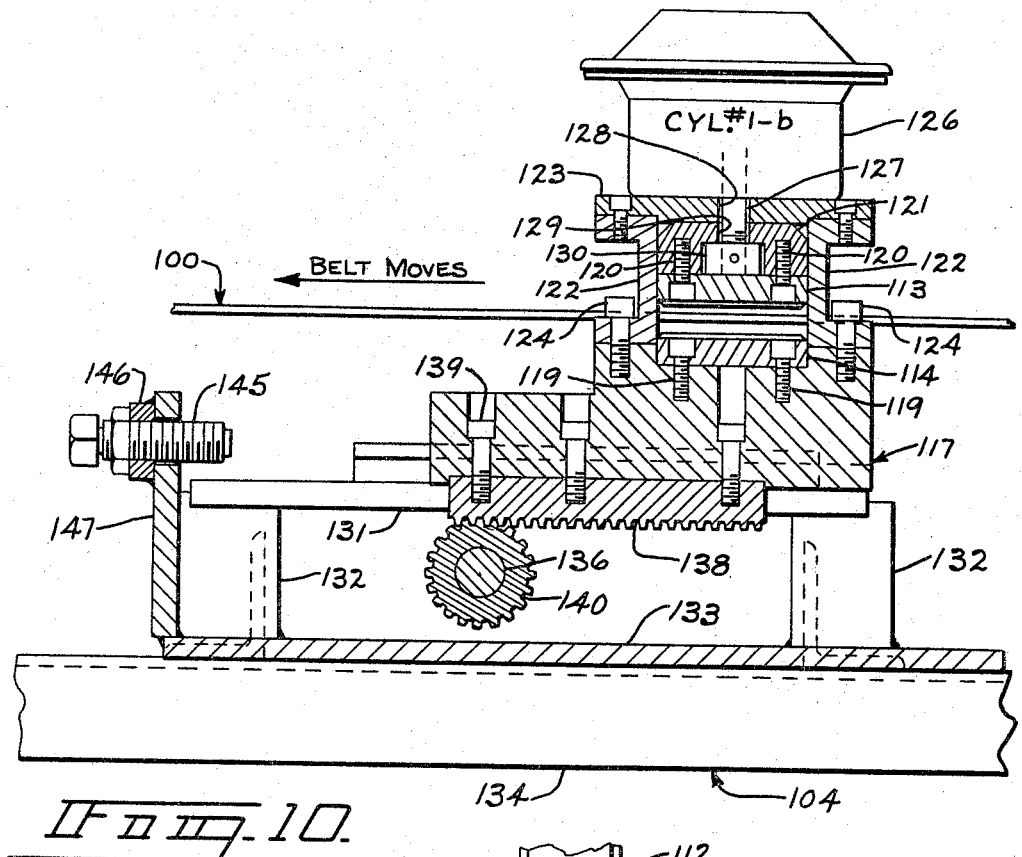
FIG. 10 is a fragmentary, vertical sectional view, taken along the line 10—10 of FIG. 8 and shown on a slightly reduced scale.

In general, an apparatus embodying the invention for the fabrication of multiple unit assemblies of ceramic tile comprises an assembly belt 100 which extends across an elongated table 101 and around a pair of drums 102 and 103. The drums 102 and 103 are rotatably journaled at the opposite ends of an elongated framework 104 which supports the various machine components and, also, the table 101. The drum 103 is journaled by bearings 105 (see also FIG. 24) which are slidably mounted in horizontal guides 106 and provided with adjustment screws 107 so that the bearings 105 can be moved longitudinally of the framework 104 for tightening and loosening the belt 100. The drum 102 (FIGS. 2 and 6) is journaled on the front end of the framework 104 by fixed position bearings 108.

The upper horizontal span of the belt 100 is supported primarily by the table 101 which later will be described in detail, and the lower, or return, span of the belt 100 travels back from the right to the left end of the machine beneath the table 101, passing through a belt-cleaning mechanism 109 (FIG. 6) which insures that no pieces of tile, broken tile, or other foreign material remain on either surface of the belt 100 so as to interfere with assembly of groups of tile pieces thereon.

Upon departure from the drum 102 at the left or front end of the apparatus, the belt 100 is led through a belt-feeding mechanism generally indicated by the reference number 110. In the embodiment illustrated in the drawings the belt-feeding mechanism 110 intermittently feeds the belt 100 through the distance indicated by the double-headed arrow bearing the legend "Feed" in FIG. 2. As will be explained below, the "Feed" distance is four inches, or one-third of the longitudinal dimension of a basic multiple unit group. In this embodiment such a basic group of individual units of ceramic tile pieces, nominally 1″ x 1″, is made up of twelve pieces longitudinally of the belt 100, and twenty-four pieces transversely of the belt 100. Thus, three feeding strokes of four inches each are required to feed the belt 100 a distance corresponding to the 12″ dimension of a multiple unit group longitudinally of the belt. The three-to-one ratio is determined by the use of mechanism to simultaneously deposit four rows of individual resinous masses at a time, on one inch centers. The belt-feeding mechanism 110 and its component parts are more fully disclosed in FIGS. 8–11, and will be described below.

After departure from between the components of the belt-feeding mechanism 110, the belt is led through a resin depositing mechanism, generally indicated by the reference No. 200, and shown in greater detail in FIGS. 7, 12 and 14–17, inclusive. The resin depositing mechanism is actuated in timed sequence relative to the actuation of the belt-feeding mechanism 110 in order to deposit a group of individual resinous masses 201 (FIG. 3), four long and twenty-five wide, on the assembly belt 100. The individual resinous masses 201 are positioned on the belt 100 in a reticulated pattern so spaced that each of the resinous masses 201 contacts adjacent corners of individual tile pieces 202, which are deposited in multiple unit assemblies on the belt 100 by a tile transfer mechanism generally indicated by the reference No. 300, and illustrated in greater detail in FIGS. 18–23 of the drawings. The tile transfer mechanism 300 functions to pick up a group of the tile pieces 202, to carry the group transversely of the belt 100, and to deposit the group of tile pieces 202 on the previously deposited discrete resinous masses 201.

As explained briefly above and in greater detail below, in the machine illustrated in the drawings, the belt-feeding mechanism 110 moves the belt 100 one-third of the longitudinal length of a unitary assembly of ceramic tile pieces 202 upon each actuation. Similarly the resin depositing mechanism 200 is actuated three times to deposit three groups of resinous masses 201 in the reticulated pattern on the belt 100 for each cycle of operation of the tile transfer mechanism 300. It will be appreciated that if assemblies of tiles of different sizes and in different numbers are to be assembled upon a machine embodying the invention, different cycles of operation, for example, two feeding movements and two individual resinous mass depositing movements may be required for each tile group depositing cycle. Conversely, in other instances and utilizing other sizes of individual pieces, there may be only one belt-feeding movement and one resinous mass depositing movement for each cycle of the tile transfer mechanism 300.

As can best be seen by reference to FIG. 2, the table 101 extends beneath the belt 100 in the area of the tile transfer mechanism 300 and of the resinous mass depositing mechanism 200 but does not extend beneath the belt 100 in the area of the belt-feeding mechanism 110. The table 101 functions as a surface plane for the support of the flat assembly belt 100 so that the upper surface of the assembly belt 100 lies in a plane and serves to establish the plane of the back faces of the individual resinous masses 201 and thus the bottom plane of the finished assembly of tile pieces 202, which embodies the inventions of the mentioned Macdonald et al. Patent No. 3,041,785 and application Ser. No. 85,367.

Operation of the belt-feeding mechanism 110, the resinous mass depositing mechanism 200 and the tile transfer mechanism 300, is automatically controlled by the pneumatic system illustrated in FIG. 28, the component parts of which will be designated by reference numbers in the 400 series, and under the control of an electrical system diagrammatically illustrated in FIG. 31a and 31b, the component parts of which will be generally designated by symbols and by such reference numbers as are necessary in the 500 series.

After departure of the assembly belt 100 from beneath the tile transfer mechanism 300, it then passes through an elongated curing oven 600 which is erected above the framework 104 and which overlies the belt 100 in order to cure the resin in the small resinous masses 201. The curing oven 600, for example, may contain a series of infrared heating lamps 601 located above and beneath the belt 100 and maintained at a proper temperature for setting up the resin in the masses 201 during their passage through the oven 600.

After leaving the oven 600, the belt 100 and the multiple unit assemblies thereon are led through a cooler 602 to which a supply of air is fed in order to cool the belt 100, itself, the tile pieces 202 and the resinous masses 201 to enable their removal from the assembly belt 100. At the end of the framework 104 there is located a tile assembly deflecting mechanism generally indicated by the reference number 603 and illustrated in FIG. 24, through which the relatively flexible assemblies of individual ceramic tile pieces 202 are led in order to separate these assemblies from the belt 100 and to permit an operator to remove them in sheets of measured sizes, as illustrated, or as a continuous sheet.

The tile transfer mechanism 300 comprises means for assemblying a group of individual tile pieces 202. In the embodiment illustrated in the drawings each group, such as groups A and B shown in place on the belt 100 in FIG. 2, and illustrated in greater detail in FIGS. 3–5, consists of 288 individual pieces 202 each a modular 1″ x 1″ in size. While this modular size of tile will be the example of tile units utilized in the description of a machine embodying the invention, it will be appreciated, of course, that a machine embodying the invention may be utilized for the fabrication of multiple tile assemblies made up of pieces of other sizes or of a variety of sizes. A group C is also shown in FIG. 2 in position at one side of the belt 100 in which it is initially collected upon the assembly board illustrated in FIG. 25 for movement into place on the belt 100 by the tile transfer mechanism 300.

Referring now in particular to FIGS. 3, 4 and 5, each group of individual tiles 202, such as the group B shown in FIG. 3, comprises a plurality of individual tile units 202 assembled together by means of the small masses of resin 201. Each of the masses of resin 201 extends upwardly between the edges of the individual tile units 202 and is bonded directly to portions of back surfaces 203 adjacent the edges thereof as well as to portions of edge surfaces 204 of the tile units 202 which are contiguous to the portions of the back surfaces to which the resinous masses 201 are bonded. Each of the resinous masses 201 in the interior of the groups A, B, C, etc., contacts and is bonded to the corners of four of the tile units 202. At the outer edges of the groups A, B, C, etc., resinous masses 201a extend between only two of the tile units, indicated by the reference number 202a.

The resinous masses 201a along the sides of the assemblies of tiles are slightly closer to the next adjacent resinous masses 201 than the masses 201 are to each other, so that the masses 201a will not extend laterally outside the margins of the edge tile units 202a, which delineate the longitudinal edges of either the basic assemblies of tile pieces 202 (12×24=288 pieces) or the longitudinal edges of a continuous sheet of tile pieces 202, which is twenty-four pieces wide. In contrast, it can also be noted in FIG. 3 that individual masses of resin 201b, each of which is in contact with the corners of only two tiles 202b, do protrude beyond the edges of the tiles 202b in a direction longitudinally of the belt 100. The protruding portions of the resinous masses 201b are contacted by the first tiles 202c of the next successive group of tiles to be deposited upon the belt 100, for example, those tiles of the group B in the row indicated by the reference No. 202c, in FIG. 3, were similarly initially deposited upon protruding portions of individual resinous masses which extended out from beneath the edges of the tiles in a row indicated by the reference No. 202d, in the previously deposited group A.

*Belt-feeding mechanism (FIGS. 6 and 8–11)*

Figure 11:
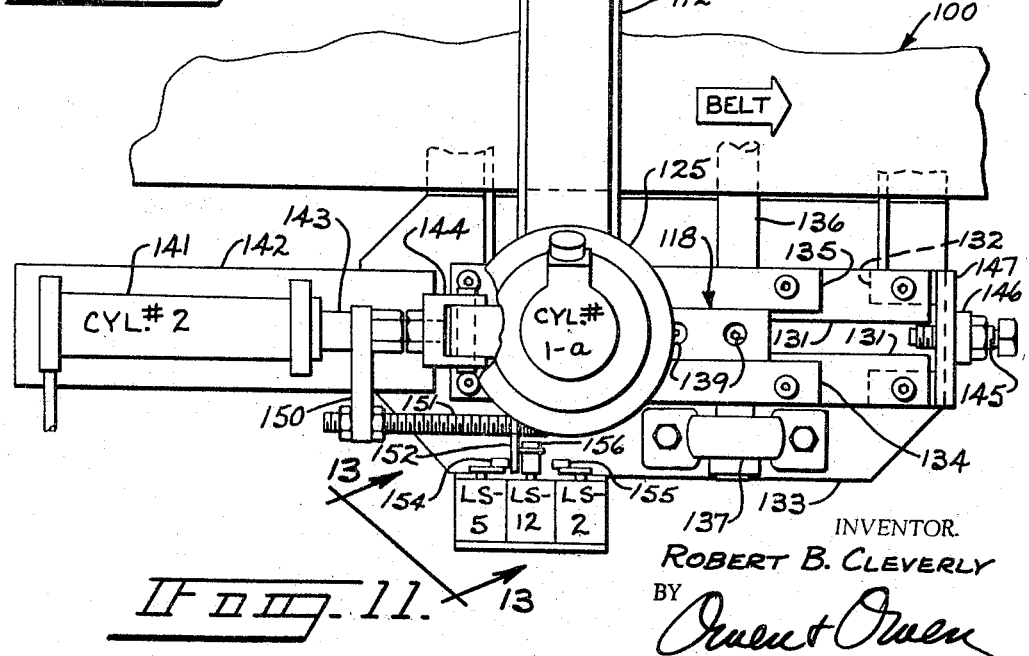
FIG. 11 is a fragmentary horizontal plane view taken along the line 11—11 of FIG. 6 and shown on an enlarged scale.

The belt-feeding mechanism 110 comprises a pair of transversely extending, clamping members 111 and 112, each of which consists of a flat bar 113 or 114, respectively, a channel 115 and a clamping pad 116. The lower bar 114 extends horizontally across beneath the level of the belt 100 and its ends are rigidly secured to a pair of moveable pedestals 117 (FIGS. 8 and 10) and 118 (FIG. 11). The ends of the lower bar 114 are secured to the pedestals 117 and 118 by cap screws 119, the upper surfaces of the pedestals 117 and 118 being cross-milled to accept the ends of the flat bar 114. The outer ends of the upper cross bar 113, are similarly secured by cap screws 120 to blocks 121. Each of the blocks 121 is vertically moveable between a pair of flanged guides 122, mounted on the pedestals 117 or 118 and extending vertically and parallel to each other with their upper flanges secured to and spaced by a top plate 123. The bottom flanges of the guide 122 are secured to the top of the pedestal 117 or 118 by suitable cap screws 124.

Two pneumatic cylinders 125, bearing the legend "Cyl. #1–a," and 126, bearing the legend "Cyl. #1–b" are mounted on the top plates 123 with their piston rods 127 extending downwardly through bores 128 in the top plates 123 and extending through aligned bores 129 in the blocks 121, the bores 129 being enlarged at their bottoms to accept threaded spacing nuts 130 on the ends of the piston rods 127. When the cylinders 125 and 126 are energized to pull their piston rods 127 upwardly, the spacing nuts 130 bear against the shoulders of the enlarged portion of the bores 129 to raise the blocks 121 and raise the cross bar 113 and the upper clamping member 112. Conversely, when the cylinders 125 and 126 are energized to push their piston rods 127 downwardly, the spacing nuts 130 bear against the upper surfaces of the upper cross bar 113 to push the bar 113 in the upper clamping member 112 downwardly, pinching the belt 100 between the pad 116 on the upper clamping member 112 and the pad 116 on the lower, non-moveable clamping member 111.

Each of the pedestals 117 and 118 is mounted for reciprocatory movement on a pair of rails 131, which are in turn supported by spaced, vertical posts 132 that are welded or otherwise mounted upon aprons 133 carried by main, longitudinal, side angles 134 of the main frame 104. Parallel gibs 135 are fixed on top of the posts 132, and their inner edges overlap edges 135a (FIG. 8) of the bases of the pedestals 117 and 118.

A cross shaft 136 is journaled by a pair of heavy outboard bearings 137, each of which is mounted at the outer side of one of the aprons 133. A rack 138 is secured to the under side of each of the pedestals 117 and 118 by assembly screws 139, and extends parallel to and between the rails 131. Each of the racks 138 is meshed with one of a pair of pinions 140, which is keyed on the corresponding end of the shaft 136 between the posts 132.

The entire assembly comprising the rigid, transversely extending clamping members 111 and 112, the pedestals 117 and 118 and the cylinders 125 and 126 slides longitudinally on the rails 131, the simultaneous movement of both pedestals 117 and 118 and thus of both ends of the clamping bars 111 and 112 being insured by the positive engagement of the racks 138 with the pinion 140 keyed to the shaft 136. The assembly is reciprocated by a horizontal cylinder 141 bearing the legend "Cyl. #2" which is rigidly mounted on an extension 142 of the front apron 133. The cylinder 141 has a piston rod 143 (FIG. 11) yoked to the sliding pedestal 118 by a clevis and pin 144. The stroke and distance of movement of the pedestal 118 and thus the pedestal 117 and the length of the "Feed" movement of the belt is determined by a pair of heavy (opposed) stops 145 (FIGS. 10 and 11), each of which is threaded through a collar 146 mounted on a vertical plate 147 welded to, and supported by, a pair of the posts 132.

A limit switch designated LS–1 (FIG. 8) is mounted on the lower clamping member 111 with its actuator 148 in line to be moved downwardly by a finger 149, carried by the upper, vertically movable clamping member 112. An arm 150 (FIG. 11) is carried by and extends horizontally from the piston rod 143 of the cylinder 141. The arm 150 mounts a threaded extension 151 (see also FIG. 13) on which an inverted L-shaped finger 152 is adjustably mounted. The finger 152 has a downwardly extending portion 153 which engages actuators 154 and 155 of two limit switches bearing the designations LS–5 and LS–2, respectively, and the main body of the finger 152 engages an actuator 156 of a centrally located limit switch LS–12.

The actuator 148 of the limit switch LS–1 is normally held in the up position, illustrated in FIG. 8. The actuator 154 of the limit switch LS–5 (FIG. 13) is normally urged into the dotted line position, and the actuator 155 of the limit switch LS–2 is normally urged into the solid line position. The actuator 156 of the limit switch LS–12 is spring urged toward an "open" center position illustrated in FIG. 13 and is only alternately moved to its extreme positions by the finger portion 153, in passing. The limit switch LS–12 is thus oppositely and momentarily actuated during each forward and reverse stroke of the cylinder 141. More detail of the function and operation of the limit switches LS–1 (FIG. 8) and LS–5, LS–12 and LS–2 (FIG. 13) will be explained below in the section of this specification relating to the wiring diagram of FIGS. 31a and 31b.

Because the assembly belt 100 passes through the oven 600 it must be fabricated from material which is not harmed by the elevated temperature. The material of the belt 100 or a coating thereon must also be inert to the resin in the masses 201 and of such nature that the resin, after curing, will not adhere to the surface of the belt 100. In order for the belt 100 to be accurately indexed through successive "Feed" strokes by the belt feeding mechanism 110, it must also be inelastic longitudinally so that the pull of the mechanism 110 can be transferred through the entire length of the belt 100 around the drums 102 and 103 and back to the area just in advance of the belt-feeding clamps 111 and 112. A conventional tensioning mechanism, not shown, may be located beneath the table 101 somewhere along the lower span of the belt 100 as desired.

*Resin depositing mechanism (FIGS. 6, 7, 12 and 14–17)*

In the embodiment of the invention disclosed in the drawings, the resin depositing mechanism 200 comprises a series of metering pumps 205, (FIGS. 6 and 7) all of which are mounted for vertical reciprocation as a group in a frame 206 comprising an upper cross angle 207 (FIG. 14), vertical end bars 208, and a bottom cross member 209 which functions as a manifold plate for connecting each of the pumps 205 to a group of individual nozzles 210. The entire frame 206 with the group of metering pumps 205 is guided in its vertical movement by a pair of vertical guide rods 211 (see FIG. 12) which are mounted in vertically aligned, externally threaded sockets 212 and 213. The upper sockets 212 are bolted to overhanging shoulder brackets 214 and the lower sockets 213 are similarly bolted to lower shoulder brackets 215, the shoulder brackets 214 and 215 being in turn bolted to the inner sides of vertical beams 216 of a bridge structure which also comprises a horizontal top beam 217. The bottom ends of the vertical beams 216 rest upon and are secured to the main longitudinal angle frames 134 of the framework 104. The vertical beams 216 stand on flat pads 218 which are bolted through elongated slots 219 in the pads 218 to the main side angles 134. The position of the mechanism 200 longitudinally of the belt 100 is determined by horizontal anchor bolts 220 which extend from anchor blocks 220a that are bolted in fixed position on the side angles 134.

The table 101 extends beneath the resin depositing mechanism 200, resting upon the inner edges of the angle frames 134 and, in turn, supporting the assembly belt 100.

Each of the vertical guide rods 211 extends into its lower socket 213 and is secured in its upper socket 212 by a machine screw 221 threaded into the upper end of the guide rod 211, and locking the rod in the upper socket 212. The pump carrying frame 206 is mounted on the guide rods 211 by shoes 222 which are rigidly mounted in and welded to oppositely extending horizontal arms 223, which are welded to, and extend outwardly from, the end bars 208 of the pump frame 206.

The outer surface of each of the upper sockets 212 is threaded for the reception of a vertically extending, split, spacing collar 224. A shorter, solid, lower spacing collar 225 (see also FIG. 16) is threaded onto each of the lower sockets 213 along with a locking nut 226. The collars 224 and 225 are thus vertically adjustable to determine the precise upper and lower limits of the reciprocatory stroke of the pump carrying frame 206.

As can best be seen in FIG. 16, each of the upper split spacing collars 224 is U-shaped in cross section providing a groove 227 open to the side so that it can be slipped horizontally over its respective vertical guide rod 211. The upper spacing collars 224 may readily be removed from around the guide rods 211 simply by unscrewing them from the threaded engagement with the upper sockets 212 and sliding them off the rods horizontally. The upper spacing collars 224 thus function to establish the upper limit of the vertical travel of the pump frame 206 and yet readily may be removed when it is desired to raise the entire pump frame 206 for servicing or ready access to the pumps 205 or the banks of nozzles 210.

Each of the pumps 205 is connected by a tube 228 (FIG. 14) to a resin manifold pipe 229 (see also FIG. 28) leading through suitable pump and pressure means to a resin supply tank 230. By means of a conventional pump and pressure controller (not shown), the pressure in the resin tank 230 is maintained at a desired level in order to insure a constant supply of resin to all of the pumps 205. Each of the pumps 205 is also connected to a transversely extending pneumatic manifold pipe 231 by a tube 231a. The manifold pipes 229 and 231 are welded at their ends to mounting plates 232, which are, in turn, bolted to angle brackets 233 that are welded to the top cross angle 207 of the pump frame 206.

The entire pump frame 206 is moved vertically by a pneumatic cylinder 233 (FIG. 7), which bears the legend "Cyl. #3," and with which is associated a solenoid actuated pneumatic valve bearing the legend "Sol. V–3." The cylinder 233 is mounted by a heavy plate that is welded to the top beam 217 and has a vertically extending piston rod 234 which is guided through the top beam 217 and bolted to the main cross angle 207 of the pump frame 206.

Each of the pumps 205 is a metering pump of the type wherein a measured charge of a liquid resin that is supplied to the pump 205 from the resin manifold 229 by its particular tube 228, is discharged from the pump 205 each time that air under pressure is admitted into the pneumatic manifold 231 and, by the tube 231a, into the pump 205. Any type of conventional metering pump may be employed, the particular pumps illustrated in the drawings not constituting a part of the instant invention, and having been obtained commercially from Pyles Industries, Inc., of Southfield, Mich., under their designation "AMV 482A." Each of the pumps 205 is connected by a nipple 236 to a coupling block 237 (FIG. 14) or 237a (FIG. 7). Each of the coupling blocks 237 or 237a is threaded into a socket in the edge of the manifold cross member 209.

Referring, again, to FIG. 3 it will be observed that there are twenty-five masses of resin 201 in each row extending transversely of the belt 100, this number following from the fact that a multiple unit assembly of nominal 1″ x 1″ tiles comprises rows of twenty-four individual tiles 202 and because the end masses of resin 201a are located at each of the ends of each of the transverse rows of tiles 202. In order to deposit twenty-five discrete resinous masses 201 or 201a in each of the transverse rows of resinous masses, the apparatus has twenty-five sets of four nozzles 210 providing four transverse rows of nozzles 210. A set of nozzles is shown in FIG. 14, the rows being indicated by the reference numbers 210, 210a, 210b and 210c. The twenty-five sets of nozzles 210 are supplied by thirteen pumps 205. Twelve of the pumps 205 are connected by their coupling blocks 237 to two sets of four nozzles 210. The centermost pump indicated by the reference No. 205a in FIG. 7 is connected by its nipple 236a to the coupling block 237a on the side of the lower manifold cross member 209 opposite from the twelve coupling blocks 237 to which the pumps 205 are connected. The pump 205a is aligned with and supplies resin to only the centermost set of four nozzles 210, 210a, 210b and 210c. The centermost pump 205a is so adjusted as to deliver a charge of resin suitable for feeding four nozzles and thus depositing only four masses of resin 201 on the belt 100 and the other twelve pumps 205 are so adjusted as to discharge a mass of resin sufficient to supply eight of the nozzles 210 into two adjacent sets of nozzles to form eight masses of resin 201 on the belt 100. Except for this difference in setting, the pumps 205 and 205a and the nozzles 210 in all of the sets and rows function identically.

Each of the nipples 236 (FIGS. 15 and 17) is threaded into its coupling block 237 and placed in communication with a cross-passage 238 which is connected, in turn, to a pair of spaced horizontal bores 239. Each of the coupling blocks 237 is retained on the manifold 209 by a pair of plugs 240 each of which has intersecting internal passageways and which extend through and close the bores 239, being threaded into the tapped ends of two adjacent, parallel passageways 241 in the manifold cross member 209 that are axially aligned with the bores 239. Each of the passageways 241 is intersected by four vertical bores 242 in the manifold cross member 209. The open upper end of each of the bores 242 is threaded to receive a thimble 243 and the open lower end of each of the bores 242 is tapped to receive a threaded tenon on the upper end of one of the nozzles 210. A cone tipped valve stem 244 extends downwardly through the thimble 243, its lower end being aligned to close the center opening in a washer 245 above the nozzle 210. The upper end of the valve stem 244 is threaded through the thimble 243, protruding above the thimble 243, and may be locked in place relative to the thimble 243 by a lock nut 246. The valve stems 244 are shown in FIG. 15 in the "nozzle open" position in solid lines, and one of the stems 244 is shown in the "nozzle closed" position, in dotted lines.

When the apparatus is initially set up for any particular nominal size of tile pieces to be assembled in groups of any particular number, the nozzles 210 in the respective rows 210, 210a, 210b, and 210c are opened or closed as necessary to produce the particular pattern for the particular sizes and assembly of tiles by raising or lowering the valve stems 244 and locking them in place with the locking nuts 246. For example, if the individual tile pieces measure nominally 2" x 2", then only the nozzles in rows 210 and 210b (FIG. 14) are opened, so that the individual resinous masses 201 are spaced approximately 2" from each other longitudinally of the belt. Similarly, only the nozzles in alternate sets of four in the rows 210 and 210b are open so that the resinous masses are spaced 2" from each other transversely of the belt. As a further example, if the individual tile pieces 202 measure 1" x 2" with the larger dimension extending transversely of the belt 100, all four of the nozzles 210, 210a, 210b and 210c in each alternate set of nozzles are opened with the nozzles in the intervening sets closed.

A vacuum block 247 (FIGS. 7 and 14) extends transversely across the table 101 beneath the area where the resin masses 201 are deposited on the upper surface of the assembly belt 100. The vacuum block 247 has a transversely extending series of spaced ports 248, each of which is aligned with a similar port 249 in a flat cushion 250 adhered to the upper surface of the block 247, and also with one of a transversely extending series of ports 251 in the table 101. A vacuum line 252 is connected to the block 247 and, through a manifold slot therein, to the ports 248, in order to draw a vacuum on the under side of the assembly belt 100, so that it is flattened closely upon the table 101 in the area where the masses of resin 201 are deposited on the belt 100.

Two limit switches LS–3 and LS–4 are mounted by a bracket 253 atop the cross beam 217 (FIG. 7). The limit switch LS–3 has an actuator 254 which is engaged by a finger 255 positioned on a rod 256 extending upwardly from the cross angle 207 of the pump frame 206. The finger 255 contacts the actuator 254 when the pump frame 206 reaches its bottommost position. The limit switch LS–4 has an actuator 257 which is engageable by a finger 258 similarly mounted upon a second vertical rod 259 which also extends upwardly from the cross angle 207 of the pump frame 206. The actuator 257 is engaged when the pump frame 206 reaches its uppermost position.

*Tile transfer mechanism (FIGS. 18–23 and 25–27)*

The tile transfer mechanism for handling groups of tile, which is generally indicated by the reference No. 300, functions to pick up a group of tile pieces 202 which have been previously arranged in a pattern such as that indicated by group C of FIG. 2, to transport this group of tile pieces with their front faces uppermost into a position overlying the assembly belt 100, and then to press the entire group of tile pieces 202 downwardly into contact with the masses of resin 201 on the belt 100, and to flatten the back surfaces of the masses of resin against the belt 100 and into a common plane. In that area of the table 101 where the tile pieces are pressed downwardly to flatten the masses of resin 201, the table 101 (FIG. 19) consists of a plurality of closely adjacent T bars 101a which span the distance between the main side angles 134 of the framework 104. The individual T bars 101a are used in this area of the table 101 to resist the substantial pressure exerted downwardly on the group of tile pieces 202 in order to squeeze the resin in the masses 201 up between the edges of the tile pieces 202, and to flatten out the back faces of the resinous masses 201 and also to resist warpage which might be caused by heat from the oven 600.

The individual tile pieces 202 (see FIGS. 25–27) are assembled on an assembly board 301, which is fabricated from a material such as reinforced synthetic resin and which resists warpage and distortion. The board 301 has an upper surface 302 which is slotted in both directions for the reception of thin metal strips 303, the strips 303 extending above the upper surface 302 a distance less than the thickness of the individual tile pieces 202. The metal strips 303 are spaced from each other 1", center to center, both transversely and longitudinally of the board 301. An operator places a suitable number of individual tile pieces 202 on the board and shakes them downwardly into the pockets delineated by the strips 303, and then tips the board toward one of its front corners 304, for example, in the direction indicated by the arrow bearing the legend "Jog" in FIGS. 25 and 26, to move all of the individual tile pieces 202 into the same corners of the compartments delineated by the metal strip 303. Six tile pieces 202 are thus shown jogged into the upper right corners of the cells in the fragment of the board 301 illustrated in FIG. 26. An opening 305 is drilled or formed through the body of the board 301 at each of the intersections of the metal strips 303 in order to permit ready removal of dust and tile chips and of the tile pieces 202 themselves.

After filling the assembly board 301 with the 288 individual pieces of tile 202, the operator places the board 301 on a bench 306 (FIG. 18) positioned adjacent the main framework 104 at the tile transfer mechanism 300. The bench 306 has a pair of positioning pegs 307 at one of its sides and an eccentric clamp 308 rotatably mounted on an arm 309 (FIG. 20) extending outwardly from its side opposite the pegs 307. In placing the board 301 on the bench 306, the operator engages the two positioning pegs 307 with a square corner 310 and a V-notch 311 at the sides of the board 301, then presses the board 301 downwardly on the bench 306 and clamps it in place by rotating the clamp 308 to bear against the front edge of the board 301. During each tile transfer cycle carried out by the mechanism 300, the operator replaces each board 301 which is emptied of its group of 288 individual tile pieces 202, with a successive board 301 containing a successive group of tile pieces 202. The cycle of operations of the tile transfer mechanism 300 is so designed that the operator has ample time between cycles to unclamp an empty board 301 and replace it with a full board 301.

The tile transfer mechanism 300 comprises an open frame 312 erected above the main framework 104 and spanning the assembly belt 100. The open frame 312 has four legs 313, 314, 315 and 316 which are bolted or welded to the main side angles 134 of the frame 104, cross-braces 317 extending transversely of the belt 100, and side-braces 318 extending parallel to and above the side angles 134. Two heavy cross-angles 319 are welded or otherwise rigidly secured to and extend between the legs 313 and 316, and between the legs 314 and 315, respectively. Each of the heavy cross-angles 319 rigidly mounts a pair of upwardly slotted, axially aligned slide blocks 320, each pair of blocks 320 serving to support one of a pair of horizontal, parallel guide rods 321. The two guide rods 321 slide back and forth in the blocks 320 across the table 101 and outwardly above the bench 306 (see particularly FIG. 18). A T bar 322 is mounted on each of the rods 321 and the bars 322 are connected by a cross-bar 323 at one of their ends and a pair of spaced crossbars 324 near their other ends.

Four 325 are welded at their upper ends to the two crossbars 324 and, at their lower ends, are secured to a horizontal platform 326 of a carriage generally indicated by the reference number 327 and shown in detail in FIGS. 18, 20 and 23. The carriage 327 also includes a horizontally extending, vertically moveable, hollow platen 328. The platen 328 comprises a pair of horizontal plates 329 and 330, which are parallel to each other and spaced vertically from each other by spacers 331, which extend along the four sides of the platen 328. The platen 328 is guided for vertical reciprocation by four vertical guide rods 332 located at its four corners. Each of the guide rods 332 is erected in a socket 333 (FIG. 21) welded to the upper surface of the top plate 329 of the platen 328, the rod 332 being retained in the socket 333 by a machine screw 334 accessible from the under side of the top plate 329. At its upper end each of the guide rods 332 carries a cap 335, and each of the guide rods 332 slides in a bearing 336a, socketed into the platform 326 of the carriage 327. Engagement of the upper end of the sockets 333 with the bottom of the bearings 336a and of the caps 335 with the upper ends of the bearings 336a limits the vertical stroke of the platen 328. The platen 328 is moved up and down by a pneumatic cylinder 336 bearing the legend "Cyl. #4" (FIGS. 18, 20 and 23) which is erected on the platform 326, and which has a rod 337 extending downwardly through an opening in the platform 326 and secured to the upper plate 329 of the platen 328.

The carriage 327 is reciprocated back and forth between its outboard position overlying the bench 306 and illustrated in FIGS. 18 and 23, and its inboard position overlying the assembly belt 100, by a horizontally positioned pneumatic cylinder 338 (FIGS. 18, 19 and 23) bearing the legend "Cyl. #5." The cylinders 338 (Cyl. #5) is rigidly mounted upon a cross angle 339, which is welded or otherwise mounted upon and extends transversely of the belt 100 between the frame-legs 314 and 315. The cylinder 338 has a long piston rod 340, which is connected at its outermost end to a bracket 341 on the platform 326 (FIG. 18) of the carriage 327.

As can best be seen by reference to FIG. 20, the bottom plate 330 of the platen 328 has a plurality of apertures 342 leading into its hollow interior and aligned with the centers of the individual tile pieces 202 when the tile pieces 202 are positioned on the board 301. A cushion 343 is adhered to the under surface of the bottom plate 330 and apertures 344 in the cushion 343 are aligned with the apertures 342 in the bottom plate 330.

A flexible vacuum line 345 is connected to the upper plate 329, and in communication with the hollow interior of the platen 328 in order to apply vacuum to the interior of the platen 328 and, through the apertures 342 and 344 to the upper surfaces of the tile pieces 202 when the platen 328 is in its lower, tile contacting position at its outboard position overlying the bench 306 in order to pick up the group of 288 tile pieces 202 when the platen 328 is lifted upwardly. A vacuum breaker 346 is also mounted on the platen 328 in order to quickly break the vacuum in the platen 328 and thus on the tiles 202 when it is desired to release the group of tiles when the platen 328 is in the inboard position overlying the belt 100, and after it has been moved downwardly to force the bottom surfaces of the tile 202 into engagement with the masses of resin 201.

Control of the cycle of movement of the carriage 327 and the platen 328, is accomplished by means of a number of limit switches which are so positioned in the tile transfer mechanism 300 as to be actuated upon movements of the carriage 327 and the platen 328. When the carriage 327 is in the "outboard" position (FIG. 23) above the bench 306, and the platen 328 is in upper position, a finger 347 mounted on one of the caps 335 engages an actuator 348 of a limit switch LS-6. When the carriage 327 is in the "outboard" position and the platen 328 is descending toward its lower position: (1) an arm 349 (FIG. 20) engages an actuator 350 of a limit switch LS-14 which is positioned at the side of the framework 104 adjacent the leg 316 (FIG. 18) and (2) a finger 351 (FIG. 21) mounted atop one of the guide rods 332 at the corner of the platform 326 adjacent the framework 104 (FIG. 18) engages an actuator 352 of a limit switch LS-10 which is carried by the platform 326. Whenever the carriage 327 is in the outboard position (FIG. 23) a bracket 353 welded to the upper side of one of the T rails 322, engages an actuator 354 of a limit switch LS-9 which is mounted on the vertical leg 315 of the open frame 312. An upwardly extending arm 355 that is welded to the upper side of the T rail 322 alternately engages actuators 356 and 357 of two limit switches LS-7 and LS-8, respectively, which are mounted on the vertical legs 314 and 315, respectively, when the carriage 327 is in the inboard position overlying the belt 100 and in the outboard position overlying the bench 306, respectively. Two limit switches LS-11 and LS-13 (FIG. 19) are erected on brackets 358 and 359, respectively, mounted upon the main side angles 134 of the framework 104, at the side of the table 101 remote from the bench 306 (see also FIG. 18). When the carriage 327 is in the inboard position above the belt 100 and just before the tile pieces 202 carried by the platen 328 are engaged with the masses of resin 201 on the belt 100, an actuator 360 of the limit switch LS-11 (FIG. 23) is engaged by a finger 361 extending outwardly from the back side of the platform 326. The limit switch LS-13 (FIG. 22) has a "one-way" actuator 362 which is engaged by a finger 363 also mounted on the rear side of the platen 328. The actuator 362 of the limit switch LS-13 is of such design that when the platen 328 moves downwardly, the finger 363 merely tilts a rocker 364 on the actuator 362 but does not move the actuator 362. When the platen 328 moves upwardly, however, the finger 363 strikes the rocker 364 and swings the actuator 362 to actuate the limit switch LS-13 just before the platen 328 reaches its uppermost position.

A more complete explanation of the function and operation of the various limit switches Nos. LS-6, LS-7, LS-8, LS-9, LS-10, LS-11, LS-13 and LS-14 which are actuated by the carriage 327 and platen 328 during the cycle of their operation, will be set forth below in the section of the specification relating to the wiring diagram shown in FIGS. 31a and 31b.

*Belt-holding clamps (FIGS. 19 and 28)*

A pair of belt-holding clamps 157, which are functionally part of the belt-feeding mechanism 110, are physically located on the two legs 314 and 315 of the open frame 312 of the tile transfer mechanism 300, and are illustrated in FIGS. 6, 19 and 28. Each of the belt-holding clamps 157 comprises a plunger 158 which has a friction pad 159 on its lower end and which is mounted on the bottom end of a rod 160 of a cylinder 161 carrying the legend "Cyl. #6a" or "Cyl. #6b," as the case may be. The cylinders 161 are actuated to press the plungers 158 downwardly to squeeze the belt 100 against the table 101 and hold the belt 100 in position between the "Feed" strokes of the belt-feeding cylinder 141 ("Cyl. #2") shown in FIGS. 6 and 11.

*Assembly deflecting mechanism (FIG. 24)*

The multiple unit assembly deflecting mechanism generally indicated by the reference No. 603 is illustrated in FIG. 24. The mechanism 603 is located at the far end of the framework 104 adjacent the drum 103 in order to deflect the continuously produced sheet of tile units 202 and to provide a position at which an operator can cut the continuously fabricated sheets into multiple unit assemblies of any desired lengths.

The assembly deflecting mechanism 603 comprises a pair of parallel, downwardly inclined side frames 604 mounted on legs 605 erected from the main frame 104 and connected at their far sides by a cross-brace 606. A deflecting roller 607 is journaled on a shaft 608 extending parallel to the axis of the drum 103, close to but not contacting the belt 100 as it passes around the roller 103. Several overhead idlers 609 are rotatably mounted upon a shaft 610 which is positioned by an upright frame 611 in order to guide the idlers 609 into frictional contact with the upper surface of a continuous sheet of individual tile pieces 202 delivered by the belt 100 over the deflecting roller 607 and beneath the idlers 609. A plurality of idler rollers 612 are mounted in inter-digitated relationship on a group of parallel horizontal shafts 613 extending across between the side-frames 604 at the downstream side of a cutting plate 614 which extends across between the upper ends of the side-frames 604 adjacent the deflecting roller 607. As the belt 100 moves, the continuous sheet of tile pieces 202 is fed over the deflecting roller 607 and across the cutting plate 614, then downwardly on the bed provided by the idler rollers 612.

When it is desired to produce multiple unit assemblies of definite size, the operator counts the number of "Feed" movements of the belt 100 necessary to produce a multiple unit assembly having a longitudinal length of the desired number of rows of individual tile pieces 202, and when the space between the last transverse row of tile pieces 202 of a first multiple unit assembly and the first transverse row of tile pieces 202 of a successive multiple unit assembly overlies the cutting plate 614, the operator can sweep a cutting knife transversely between the edges of these two rows of tile pieces 202, severing the individual resinous masses 201 to separate an individual assembly, such as the assembly 615 shown in FIG. 24, from the remaining continuous length of connected tile pieces on the belt 100 and extending through between the deflecting roller 607 and the idlers 609. When it is desired to produce a continuous length of assembled tile pieces 202, the operator counts the number of "Feed strokes" to produce the length, say 10, 12, 16 or 20 feet or more, and guides the length off of the rollers 612 and to a wind-up mechanism (not shown) severing the wound-up length from the remaining length of the sheet of individual tile pieces 202 on the belt 100, again by cutting across the cutting-board 614 to cut the masses of resin 201 along the parting line.

*Pneumatic system (FIGS. 28–30)*

The machine described in the specification is actuated by a pneumatic system schematically illustrated in FIG. 28 and comprising a number of pneumatic cylinders with their control valves and certain control elements which have previously been described in connection with sub-assemblies of the machine.

The pneumatic system comprises a vacuum pump 400 and an air-header 401 which is supplied with air under sufficient pressure to actuate the cylinders previously described. The air-header 401 is connected to the solenoid actuated valve V–1 by a line 402 and through the valve V–1 and a line 403 to the two cylinders 126 (Cyl. #1–a and Cyl. #1–b). When the solenoid actuated valve V–1 is set in "Position I" illustrated in FIG. 28, air under pressure is admitted to the cylinders 126 to move the upper belt-clamping member 112 downwardly to squeeze the belt 100 against the lower member 111 preparatory to moving the belt 100 through a "Feed" distance. In FIG. 28 the belt 100 is indicated by a plurality of large arrows designated by the reference numerals 100, the arrows being shown in the plane of the belt and extending above and below elements of the machine in the same position as the belt 100. The cylinders 126 are spring urged toward the open or retracted position so that they are only connected to the air-header 401 when it is desired to move the upper clamp 112 downwardly. The return or upward movement of the upper clamp 112 is accomplished by return springs in the cylinders 126 when the solenoid valve V–1 is shifted to "Position II" connecting the airline 403 to atmosphere.

In "Position II" of the solenoid actuated valve V–1, the airline 402 is connected through the valve V–1 to a line 404 leading to the cylinders 161 (Cyl. #6–a and 6–b) of the belt-holding clamps 157. The solenoid valve V–1 alternates the application of air under pressure to Cyl. #1–a and Cyl. #1–b and to Cyl. #6–a and Cyl. #6–b. The belt-clamping cylinders (Cyl. #1–a and 1–b) grip the belt 100 to feed it when the belt-holding cylinders (Cyl. #6–a and 6–b) are released and the belt-holding cylinders grip the belt 100 to hold it in position during the back-stroke of the belt-feeding mechanism 110, and while the resinous mass depositing mechanism 200 and the tile transfer mechanism 300 are actuated to deposit masses of resin 201 on the belt 100, or groups of tile 202 on the belt 100.

The belt-feeding cylinder 141 (Cyl. #2) is controlled by solenoid valve V–2 to advance the belt-feeding mechanism 110 and to retract that mechanism for a subsequent "Feed" movement. The solenoid actuated valve V–2 is illustrated in FIG. 30 in "Position I" in which an airline 405 is connected through the valve V–2 to the end of Cyl. #2 to advance its piston rod and to feed the belt-feeding mechanism 110. When the solenoid valve V–2 is in "Position II," the airline 405 is connected to the far end of Cyl. #2 to retract its piston and the belt-feeding mechanism 110.

The pneumatic cylinder 233 (Cyl. #3) of the resin mass depositing mechanism 200 is connected through a solenoid actuated valve V–3, and by an airline 235 to the air-header 401. Solenoid valve V–3 is identical in functioning to solenoid valve V–2 and is connected to Cyl. #3 in the same fashion as valve V–2 is connected to Cyl. #2. Solenoid valve V–3 is alternated between a "Position I" which causes the pump frame 206 to be lowered for depositing masses of resin 201 on the belt 100, and a "Position II" which causes the pump frame 206 to be raised during the feeding movement of the belt 100.

The pneumatic cylinder 336 (Cyl. #4) which travels with the carriage 327 of the tile transfer mechanism 300 and which moves the platen 328 up and down, is connected through a solenoid actuated valve V–4 by an air line 406 to the air-header 401. The solenoid valve V–4 is similar to the valves V–2 and V–3 already described, being alternated between its "Position I" which lowers the platen 328 and its "Position II" which raises the platen 328.

The pneumatic cylinder 338 (Cyl. #5) which moves the carriage 327 back and forth between its outboard position overlying the bench 306 and its inboard position overlying the assembly belt 100, also has a solenoid actuated valve V–5 and is connected through the valve V–5 by an air line 407 to the air-header 401. The solenoid valve V–5 alternates between its "Position I" which moves the carriage 327 to the outboard position and its "Position II" which moves the carriage 327 to its inboard position overlying the belt 100.

A solenoid actuated valve V–6 is located in an air line 408 leading from the air-header 401 to the air manifold pipe 231 (FIG. 14) of the resin depositing mechanism 200. The valve V–6 is normally held in its open position, illustrated in FIG. 28, but can be swung to its closed position to connect the pipe 231 through an air line 408 to the air-header 401. When the solenoid actuated valve V–6 is energized air under pressure is applied to the resin metering pumps 205 to actuate the pumps 205 for depositing the masses of resin 201 on the belt 100.

The vacuum pump 400 is connected by a main vacuum line 409 to a pair of air actuated valves 410 and 411. The valves 410 and 411 are alternately supplied with actuating air under pressure through two air lines 412 and 413, respectively, which lead from and are controlled by a solenoid actuated valve V–7. The valve V–7 is connected to the air-header 401 by an air line 414. Each of the air Solenoid valve V–7 (FIG. 28) is the control valve for vacuum in the platen 327. It is energized by current through the circuits controlled by the normally closed contact TDR–5a, during most of the cycle of the machine and connects the air-header 401 to the line 412 and thus puts air pressure on the vacuum breaker 346 on the platen 327 and also on the two air actuated valves 410 or 411 (FIGS. 28 and 29). When timer TDR–5 is running it holds the contact TDR–5a open so that the coil of solenoid valve V–7 is de-energized. Valve V–7 is then shifted to its second position, wherein it connects the air line 412 to atmosphere and connects the air line 414 to the line 413. This actuates the air actuated valve 411 to connect the main vacuum line 409 to atmosphere through the air line 420a and actuates the vacuum breaker 346 to directly connect the interior of the platen 327 to atmosphere.

While the platen 327 is in the down position, holding contacts LS–11a and LS–11b closed, the contact LS–11b closes a circuit from the power line $L_1$ through a line 542 and the contact LS–11b, then a line 543 which is connected through a coil of a transformer 544 to the power line $L_2$. The secondary coil of the transformer 544, when thus energized, rings a signal bell 545 to notify the machine operator that the deposition of tile pieces 202 on the belt 100 is occurring, that the platen 327 shortly will start upwardly and the carriage 327 will move from its "inboard" to its "outboard" position. Closure of the contact LS–11b also closes a circuit through the lines 542 and 543 and a line 546 to a counter 547 which thus counts each individual deposition of a group of tile pieces 202 on the assembly belt 100.

When the platen 327 leaves its "down" position, after depositing the tile on the belt 100, it moves upwardly releasing the contacts of limit switch LS–11 to restore vacuum to the platen 327, and momentarily actuates the limit switch LS–13 in passing. Actuation of limit switch LS–13 opens its normally closed contact LS–13a (FIG. 31b) dropping all of the counting relays R–1–R–6 out of circuit and restoring their various contacts to the positions indicated.

Because the carriage 327 is in the "inboard" position overlying the belt 100, the limit switch LS–7 has closed its contact LS–7a establishing a circuit to the "Pos. I" of the coil of the solenoid valve V–5 through a line 548 to a contact LS–6b of the limit switch LS–6 by which the device PP–5 can be discharged to impulse the "Pos. I" coil. Therefore, when the platen 327 reaches its upper position, and the limit switch LS–6 is actuated, its contact LS–6b is closed to establish a discharge circuit for PP–5 from the power line $L_2$ through a line 549 to the capacitor of PP–5, through a line 550 to the contact LS–6b and through the line 548 and the contact LS–7a to the "Pos. I" coil of the valve V–5. The pulse of current to the "Pos. I" coil of the solenoid valve V–5 shifts the connections of the "Cyl. #5" to cause movement of the carriage 327 from the "inboard" to the "outboard" position.

When the carriage 37 reaches the "outboard" position it actuates limit switch LS–8 to close its contact LS–8a, such contact remaining closed as long as the carriage 327 is in the "outboard" position. When the carriage 327 reaches the "outboard" position, the platen 328 is in its "up" position and actuates the limit switch LS–9 to shift its contacts LS–9a and LS–9b, closing the contacts LS–9b to discharge PP–4 to the "Pos. I" coil of "Cyl. #4" for for lowering the platen 327. Closure of contact LS–9b establishes a discharge circuit from the power line $L_2$ through a line 551 to the capcaitor of PP–4, a line 552 to the contact LS–9b, a line 553 through the contact SS–1a of the selector switch 534 and to the "Pos. I" coil of the valve V–4. Pulsing the "Pos. I" coil of the valve V–4 shifts its connections to "Cyl. #4" to lower the platen 327 downwardly toward the bench 306 upon which the operator, in the meantime, has clamped in place an assembly board 301 containing a group of tile pieces 202.

As the platen 327 moves toward its "down" position overlying the bench 306, it releases limit switch LS–6, returning its contact LS–6a to the position illustrated in FIG. 31b, so as to recharge the impulse device PP–5 through a circuit from the power line $L_1$, a line 554, the rectifier of PP–5, a line 555, a contact PB–6b of a push button PB–6, the contact LS–6a, the line 550, the capacitor of PP–5 and the line 549 to the main power line $L_2$. This restores PP–5 to the position where it is again ready to charge the "Pos. II" coil of V–5 upon the next occasion of movement of the carriage from "outboard" position in which it is now located to the "inboard" position to which it is to be moved after a group of tiles has been picked up by the platen 327.

As the platen 327 approaches its "down" position, it actuates limit switch LS–14 to close its contacts LS–14a (FIG. 31a) to establish a circuit from the power line $L_1$ by a line 556 to the timer TDR–5 and thence to the second power line $L_2$. Similarly to the case of the actuation of the limit switch LS–11 in the "inboard" position of the carriage 327, closure of the contact LS–14a of the limit switch LS–14 in the "outboard" position of the carriage 327 initiates the cycle of the timer TDR–5 which opens its contact TDR–5a, cutting the circuit to the solenoid valve V–7 and, in turn, breaking the vacuum to the platen 327.

When the platen 327 reaches its "down" position it again actuates LS–10 to close the normally open contacts LS–10a and initiates a cycle of the timer TDR–3, upon the termination of which TDR–3 closes its contacts TDR–3a to pulse the "Pos. II" coil of the solenoid valve V–4 to cause the "Cyl. #4" to raise the platen 327. However, because the cycle of TDR–5 is shorter than the cycle of TDR–3, contacts TDR–5a close to restore vacuum to the platen 327 prior to the end of the cycle of timer TDR–3 so that the group of tile piece 202 is adhered to the platen 327 before the timer TDR–3 times out to raise the platen 327.

Because the carriage 327 is in the "outboard" position when the platen 327 picks up the group of tiles, the contact LS–8a of the limit switch LS–8 is closed. Therefore, when the platen 327 reaches its "up" position and actuates limit switch LS–6, the impulse device PP–5 is discharged through the contact LS–6b, and the line 548 and, this time, through the contact LS–8a and the "Pos. II" coil of the solenoid valve V–5 to admit air under pressure into "Cyl. #5" and to move the cirriage 327 from its "outboard" to its "inboard" position.

When the carriage 327 leaves the "outboard" position enroute to the "inboard" position, it shifts the limit switch LS–9 to reclose its contact LS–9a. This reestablishes the charging circuit for PP–4 through a line 557 from the power line $L_1$, the rectifier of PP–4, a line 558, a normally closed contact R–5 of relay 5, a line 559, the contact LS–9a of limit switch LS–9, the line 552 and the line 551 to the second power line $L_2$. PP–4 is again ready for pulsing to lower the platen 327 after the carriage 327 reaches the "inboard" position.

In the machine illustrated in the drawings, the relationship between the number of rows of resinous masses 201 deposited by the mechanism 200 in each of its cycles and the "Feed" distance of movement of the belt 100 produced by each cycle of the belt-feeding mechanism 110, is three to one with respect to the number of rows of tile pieces 202 deposited on the belt 100 by each cycle of the tile transfer mechanism 300. Therefore, if the carriage 327 reaches the "inboard" position overlying the belt 100 before the belt-feeding mechanism 110 and the resinous mass depositing mechanism 200 have completed their three cycles, it is necessary that the platen 327 be maintained in its upper position until the three "Feed" movements have been completed. The relationship is maintained by the relay R–5 which is not pulled into circuit to close its contact R–5b to discharge the impulse device PP–4, for lowering the platen 327, until the third "Feed" movement of the belt 100 has been completed.

However, it may be possible that for any of several reasons, the platen 327 has not, in fact, picked up a group of tile pieces 202 but has been moved into its "inboard" position anyhow. Because of the vacuum responsive switch 421 in the circuit to relay R–5 (bottom FIG. 31b) the relay R–5 did not come in even though the contact LS–12a was closed during the third "Feed" movement. Therefore, no pulse of current was fed to the "Pos. I" coil of solenoid valve V–4 and the platen 327 remained in the up position. However, the third "Feed" movement and closure of contact LS–12a did close the circuit to the coil of relay R–6 and opened its contact R–6a (FIG. 31a, near the top) in the circuit to the timer TDR–1.

When the belt-feeding mechanism 110 completed its third "Feed" stroke, the limit switch LS–2 was shifted to lower the resin pumps 205. The resin discharge cycle was completed and the resin pumps 205 returned to their upper position. When the pumps reached their upper position, the limit switch LS–4 was actuated to close its normally open contacts LS–4a and to pulse current to the "Pos. II" coil of solenoid valve V–1, opening the cylinders "Cyl. #1a" and "Cyl. #1b" to open the belt-feeding clamps 111 and 112. Opening of the belt-feeding clamps 111 and 112 shifted limit switch LS–1 to pulse the "Pos. II" coil of solenoid valve V–2 and caused the belt-feeding mechanism 110 to go through a return stroke.

At the end of the third return or retract stroke of the belt-feeding mechanism 110, the limit switch LS–5 is actuated to close its content LS–5a in the circuit to the timer TDR–1. However, because relay R–6 came in during the third "Feed" stroke, the contact R–6a is open and the circuit to timer TDR–1 cannot be established so the contact TDR–1a of the timer TDR–1 will not close and no current can be fed to the "Pos. I" coil of the solenoid valve V–1 to close the belt-feeding clamps 111 and 112 and continue the normal cycling of the machine. Therefore, the belt holding clamps 157 remain closed; the belt-feeding clamps 111 and 112 remain open; the belt-feeding mechanism 110 remains in the retract position; and, as explained just above, the platen 327 remains in its "up position."

When the platen 327 remains "up" in the "inboard" position of the carriage 327, as explained, the operator first closes a push button PB–5 in order to close its contact PB–5b (FIG. 31b at the bottom), and to set up a test circuit from the power line L₁, through a line 560 to the line 535, the contact LS–7b and the vacuum responsive switch 421 to relay R–5. If the vacuum responsive switch 421 is closed, indicating the presence of tile on the platen 327, this will bring in relay R–5 to initiate a downward movement of the platen 327. However, if in fact there is no tile on the platen 327, the vacuum switch 421 is open and closure of the contact PB–5b of push button PB–5 will not bring in relay R–5. This shows the operator that there is no tile on the platen 327 without requiring him to peer up under the platen 327 which is relatively inaccessible in the "inboard" position.

Having determined that no tile is present on the platen 327, it is necessary for the operator to be able to cause the return of the carriage 327 from the "inboard" position overlying the belt 100 to the "outboard" position overlying the bench 306 so that the platen 327 can be lowered to pick up tile. In the circumstances described, the operator makes sure that an assembly board 301 filled with tile is in place on the bench 306 and then manually closes a push button PB–6 to open its contact PB–6b in the charging circuit of PP–5 and to close its contact PB–6a for pulsing the "Pos. I" coil of solenoid valve V–5 to shift the connections to "Cyl. #5" and to cause the carriage 327 to move to its "outboard" position. When the carriage 327 reaches its "outboard" position, the platen 327 moves downwardly and picks up the group of tiles. The platen 327 is moved upwardly and the carriage 327 returned to its "inboard" position overlying the belt 100. All of these movements of the carriage 327 and platen 327 subsequent to the depression of the push button PB–6 are under the control of the same automatic mechanism which controls these movements during a normal operation of the machine.

However, when the carriage 327 again reaches the "inboard" position, this time with a group of tiles on the platen 327, it merely remains there because the third closure of contact LS–12a of the limit switch LS–12 had taken place prior to the unusal circumstance now being described and the belt-feeding mechanism is holding its retract position so it cannot actuate LS–12 to close contact LS–12a to energize relay R–5 for closing its contact R–5b to pulse the "Pos. I" coil of solenoid valve V–4 to lower the platen 327.

Because the platen 327 now is loaded with a group of tile pieces 202 for deposition on the assembly belt 100, the vacuum responsive switch 421 is closed and the contact LS–7b of the limit switch LS–7 also is closed because the carriage 327 is in the "inboard" position. The operator now causes the lowering movement of the platen 327 by again pushing the push button PB–5 to close its contact PB–5b and make the circuit from the power line L₁ through the line 560, the contact PB–5b and the lines 535 and 537 to bring in both of the relays R–5 and R–6 and to reinstitute the automatic cycling of the machine which previously has been described. Energization of the coil of the relay R–5 closes its contact R–5b, pulsing the "Pos. I" coil of the solenoid valve V–4 and shifting the pneumatic connections to "Cyl. #4" to lower the platen 327 downwardly on to the belt. As previously described, energization of the coil of the relay R–6 opens its normally closed contacts R–6a to break the circuit to the timer TDR–1 and prevent the inadvertent charging of the "Pos. I" coil of the solenoid valve V–1 which would shift the belt-feeding clamps 111 and 112 or the belt-holding clamps 157.

After this operator-initiated lowering of the platen 327 and the deposition of the group of tile pieces 202 carried thereby onto the assembly belt 100, the machine returns to fully automatic operations and its cycles continue as long as the various main power switches remain closed.

Termination of a particular day's operation usually is effected by first opening the toggle switch 525 which cuts out the resin feeding mechanism 200 to terminate the deposition of the resinous masses 201 on the assembly belt 100. When the tile transfer mechanism 300 has completed the transfer of a sufficient number of tile pieces 202 onto the belt 100 to use up all of the resinous masses 201 which have previously been deposited, the operator then opens toggle switch 536 to take power from the motor of the vacuum pump 400 so as to eliminate all of the vacuum in the platen 327 and preclude the further deposition of tile pieces. The operator then opens the selector switch 534 so that the tile transfer mechanism 300 is rendered inoperative and allows the machine to continue cycling the belt-feeding mechanism 110 to feed the assembly belt 100, carrying the last number of groups of tile pieces 202 through the oven 600 and the cooler 602 and onwardly to the assembly deflecting mechanism 603 where the operator at that end of the machine removes them from the belt.

*Modified multiple unit assemblies*

As earlier mentioned, the machine and method of the invention may be employed for the fabrication of multiple unit assemblies of tiles having dimensions other than 1″ x 1″ and in groups other than 12 long and 24 wide. The fabrication of such multiple unit assemblies, in this the other side of the capacitor 507 being connected by a line 508 to the power line $L_2$. When the belt-feeding clamping members 111 and 112 are open the limit switch LS–1 is in the position indicated in FIG. 31a and the "Pulsa-Pak" PP–1 is being charged.

Upon closure of the belt mover clamps 111 and 112, as described just above, the switch LS–1 is shifted to open the circuits through the contact LS–1a–1 and close a circuit from the line 506 through contact LS–1a–2 and a line 509 to discharge the capacitor 507 through the "Pos. I" coil of the solenoid valve V–2. This shifts the valve V–2 to admit air under pressure to the belt-mover "Cyl. #2" to "Feed" the belt 100.

In addition, when the limit switch LS–1 is actuated by closing of the clamps 111 and 112, the "Pulsa-Pak" PP–2 is placed in "charging" circuit from the power line $L_1$ by a line 510 to its rectifier and a line 511 to the now closed contact LS–1b–2, thence by a line 512 to its capacitor, the opposite side of which is connected by a line 513 to the power line $L_2$.

This opposite arrangement of the two sets of contacts of the limit switch LS–1 recludes the possibility that both of the shifting coils of the solenoid valve V–2 could be simultaneously energized and insures that they are alternately energized to shift the solenoid valve V–2 between its "Pos. I" wherein the belt-mover "Cyl. #2" is connected to air under pressure to cause a "Feed" stroke and its "Pos. II" wherein the belt-mover "Cyl. #2" is connected to air under pressure to cause a return or retraction stroke.

When the belt-moving mechanism 110 feeds the belt 100 a single "Feed" distance forwardly, the finger 152 (FIG. 13) engages the actuator 156 of the limit switch LS–12, shifting it past center position to the dotted line position in FIG. 13, to close its contact LS–12a (see FIG. 31b near the bottom) to establish a circuit from the power line $L_1$ through a line 514, the contacts LS–12a, a normally closed contact R–1a of the control relay R–1 and through the coil of the control relay R–1 to the power line $L_2$. Energizing the control relay R–1 establishes a holding circuit through a line 515 from the power line $L_1$ through a normally open contact R–1b and a line 516 to the main line $L_2$, opens the normally closed contacts R–1a and closes an extension contact R–1c for the line $L_2$.

At the end of the forward stroke of the belt-feeding "Cyl. #2," the limit switch actuating finger 153 (FIG. 13) engages the actuator 155 of the limit switch LS–2. Contact LS–2a of the limit switch LS–2 normally is connected in a circuit comprising a line 517 (see FIG. 31a, at bottom) from the power line $L_1$, the rectifier of PP–3, a line 518 to contact LS–2a, a line 519 to the capacitor of PP–3 and a line 520 to the power line $L_2$, to charge the "Pulsa-Pak" PP–3. Actuation of the limit switch LS–2 opens its contact LS–2a and closes its contact LS–2b to discharge PP–3. Closure of contact LS–2b places the capacitor of PP–3 in circuit from the power line $L_2$ through the lines 520 and 519, the contact LS–2b and a line 521 to deliver a momentary impulse to the "Pos. I" coil of the solenoid valve V–3 in order to admit air under pressure to "Cyl. #3" of the resin feeding mechanism 200 for lowering the resin depositing pumps 205 downwardly into position to deposit masses of resin upon the belt 100.

As the pump frame 206 and the pumps 205 are lowered downwardly, limit switch LS–3 (FIG. 7) is actuated momentarily to close its contact LS–3a (see FIG. 31b). The contact LS–3a is connected by a line 522 to the power line $L_1$ and controls two circuits. The first circuit leads through a line 523 and the coil of a timer TDR–2 to the second power line $L_2$. The second circuit controlled by the contact LS–3a leads through a line 524, a toggle switch 525 and through the coil of a timer TDR–4, and a line 526 to the second power line $L_2$.

Closing the contact LS–3a initiates cycles of both of the timers TDR–2 and TDR–4. The cycle of TDR–2 is longer than the cycle of TDR–4 so that TDR–4 times out before TDR–2 does so. Initiating a cycle of TDR–4 closes its normally open contact TDR–4a to complete a circuit from the power line $L_1$ through the contact TDR–4a and a line 527 to the solenoid valve V–6 and thence to the second power line $L_2$. The solenoid valve V–6 shifts to connect the air-header 401 (FIG. 28) and the air line 408 to the pneumatic manifold 231 and thence to the several resin metering pumps 205 to cause the discharge of measured masses of resin from the pumps 205 onto the belt 100. The toggle switch 525 is mounted on the control panel to give the operator direct control over the feeding of resin by cutting out the circuit to the timer TDR–4. The cycle of the timer TDR–4 is long enough so that the stroke of the metering pumps 205 is completed before the timer TDR–4 completes its cycle and reopens its normally open contact TDR–4a.

Upon the reopening of the contact TDR–4a the solenoid valve V–6 is returned by its return springs to the position indicated in FIG. 28, cutting off air under pressure from the pneumatic manifold 231 of the pumps 205. The restoring springs in the pumps 205 restore them to their upper position and their metering cylinders are refilled by resin under pressure through the resin manifold 229.

Upon completion of the cycle of the timer TDR–2, which runs for a period of time sufficient to insure that the timer TDR–4 has timed out and the discharge of the resin masses has been completed, the timer TDR–2 closes its normally open contact TDR–2a momentarily to admit a pulse of current from the power line $L_1$ through a circuit comprising a line 528 from the power line $L_1$ to the "Pos. II" coil of the solenoid valve V–3 and thence to the main line $L_2$. Energization of the "Pos. II" coil of solenoid valve V–3 shifts that valve to admit air under pressure to the lower end of "Cyl. #3" and initiates an upward movement of the pump frame 206 and the metering pumps 205.

As the pump frame 206 moves upwardly (FIG. 7) it momentarily trips the limit switch LS–4. This closes the normally open contact LS–4a (FIG. 31a) of the limit switch LS–4 momentarily establishing a circuit through a line 529 from the power line $L_1$ to the "Pos. II" coil of the solenoid valve V–1 and thence to the second power line $L_2$. Energization of the "Pos. II" coil of the solenoid valve V–1 shifts the valve V–1 to reverse the pneumatic connections to "Cyl. #1–a" and "Cyl. #1–b" and to "Cyl. #6–a" and "Cyl. #6–b" to open the belt-feeding clamps 111 and 112 and to close the belt-holding clamps 157 (FIGS. 6 and 19).

As the belt-mover clamps 111 and 112 approach their wide open position, the limit switch LS–1 is again tripped to reverse the connections of the pair of contacts LS–1a–1 and LS–1a–2 and the pair of contacts LS–1b–1 and LS–1b–2. This reversal restores the contacts to the positions shown in FIG. 31a, re-establishing the "charging" circuit for PP–1 and discharging PP–2 to energize the "Pos. II" coil of the solenoid valve V–2 to shift the valve V–2 for connecting the belt-mover "Cyl. #2" to air pressure in order to start a return stroke of the belt-feeding mechanism 110.

As the belt-feeding mechanism 110 moves backwardly the contact finger 152 (FIG. 13) shifts the actuator 156 of the limit switch LS–12 to close its contact LS–12b. This closes a circuit from the power line $L_1$ through a line 530, the contact LS–12b (FIG. 31b) normally closed contact R–2a of the control relay R–2 and through the extension contact R–1c of the relay R–1 to the second main line $L_2$. Energization of the coil of the relay R–2 closes its holding contact R–2b, opens its normally closed contact R–2a and closes its extension contact R–2c. The contact R–2b establishes a holding circuit from the power line $L_1$ through the line 515, contacts R–1b and R–2b, the coil of relay R–2 and the extension contact R–1c of the relay R–1 to the power line $L_2$. The relay R–2 thus constitutes the second of the counting relays and has now counted the first reverse stroke of the belt-feeding mechanism 110.

Closure of the extension contact R–2c sets up a sequence circuit for the third counting relay R–3 which leads from the power line $L_1$ through contact LS–12a, lines 531 and 532 normally closed contacts R–3a, the coil of relay R–3 and extension contact R–2c to the second power line $L_2$. It follows, therefore, that upon the next "Feed" movement of the belt-feeding mechanism 110 the closure of the contact LS–12a will cause current to flow through the coil of the forward counting relay R–3 to establish the count of the second forward "Feed" movement of the belt-feeding mechanism 110, setting up a holding circuit for R–3 through contacts R–3b, R–2b, R–1b and the line 515 to the power line $L_1$ and through extension contact R–2c to the power line $L_2$. Relay R–3 also closes an extension contact R–3c.

A fourth counting relay R–4 is connected through its normally closed contact R–4a and line 533 to the line 530 which is controlled by the contact LS–12b of the limit switch LS–12. After the completion of the second "Feed" stroke of the belt-feeding mechanism 110 and during the following return stroke, the relay R–4 comes in to count the second return or retraction stroke of the belt-feeding "Cyl. #2" in the same fashion as the first return stroke was counted by the relay R–2.

The control circuit for a machine embodying the invention includes a selector switch 534 (FIG. 31b) which has two normally open contacts, SS–1a in the circuit to the "Pos. I" coil of solenoid valve V–4 and SS–1b which functions as an extension contact for the power line $L_2$ to the relay R–6. When the selector switch 534 is in its "Off" position the contact SS–1a prevents energizing the "Pos. I" coil of solenoid valve V–4 and thus prevents the lowering of the platen 327 under any circumstances and the open contact SS–1b prevents energizing coil of the relay R–6.

The selector switch 534 is utilized primarily during the beginning of a series of operations on the machine in order to cause recycling of the machine through counting relays R–1–R–4, inclusive, to deposit a series of resinous masses 201 on the belt 100 to fill the area of the belt 100 between the resinous mass depositing mechanism 200 and the tile transfer mechanism 300. This would be the series of masses of resin indicated by the reference number 201 in FIG. 2.

When the belt-feeding mechanism 110 starts its third "Feed" stroke, the limit switch LS–12 is shifted to close its contact LS–12a so that current flows from the power line $L_1$ through the line 514, the contact LS–12a, the line 531, a normally closed contact PB–5a of a push button PB–5 and a line 535 to a contact LS–7b of the limit switch LS–7. The contact LS–7b is in series with the vacuum responsive switch 421 and with the coil of relay R–5 and through the extension contacts R–4c, R–3c, R–2c and R–1c, is connected to the second power line $L_2$. Assuming first that the carriage 327 is in the "inboard" position so that the contact LS–7b is closed, the just described circuit can be established only when there is tile in place on the under surface of the cushion 343 (FIG. 20) of the platen 328. Even though the vacuum system is operating, unless the tile pieces 202 are in position to close the apertures 344 in the cushion 343, air flows freely through the apertures 344 and precludes the closing of the vacuum responsive switch 421.

However, even if tile is present on the under side of the platen 328 and the vacuum responsive switch 421 is closed, the apparatus still will not deposit this tile onto the belt 100 as long as the selector switch 534 is in its "Off" position because of the open contact SS–1a in the circuit leading to the "Pos. I" coil of the solenoid valve V–4. Therefore, even when the limit switch LS–7 senses the "inboard" position of the carriage 327 and even though tile is present on the under side of the platen 328 so that the circuit is established and the coil of R–5 is energized to close its contact R–5b, PP–4 is not discharged to pulse the "Pos. I" coil of the solenoid valve V–4 and the platen 327 is not lowered.

After the recycling operation through the relays R–1–R–4, inclusive, has continued for a number of strokes sufficient to deposit the desired number of rows of resin masses 201 on the belt 100, the operator then closes the selector switch 534 to enable the initiation of the tile transfer cycles and the actual deposition of the tiles 202 in position on the resinous masses 201.

When the operator is ready to commence the transfer of tile to the belt 100, he also closes a "Vacuum" toggle switch 536 which feeds current to the motor of the vacuum pump 400 and places vacuum on the platen 327.

When the selector switch 534 is closed, closing its contact SS–1a in the circuit to "Pos. I" coil of the solenoid valve V–4, and closing its extension contact SS–1b, and the belt-feeding mechanism 110 commences its next "Feed" stroke, the contacts LS–12a of the limit switch LS–12 are closed and the circuit through the coil of relay R–5 is closed to energize that relay. Simultaneously a circuit through a line 537 and a normally closed contact R–6c of the relay R–6, through the coil of the relay R–6 and through the extension contact SS–1b is also closed to energize the coil of relay R–6. When relay R–6 is energized it opens its normally closed contact R–6c and establishes a holding circuit through its contact R–6b and the line 515 to hold the relay R–6 in circuit for the time being and also opens the normally closed contact R–6a in the circuit to the timer TDR–1 to preclude actuating the cylinders "Cyl. #1–a" and "Cyl. #1–b" to close the belt moving clamps 111 and 112.

Energization of the relay R–5 closes its contact R–5b to discharge PP–4, through now closed contact SS–1a impulsing the "Pos. I" coil of solenoid valve V–4 to admit air under pressure to the "Cyl. #4" to lower the platen 327 to press the tile pieces 202 downwardly onto the belt 100.

When the platen 327 moves downwardly it shifts the contacts of LS–6 restoring them to the position shown in FIG. 31b for charging PP–5 in preparation for a subsequent step of initiating traverse of the carriage 327 in an "outboard" direction.

When the platen 327 reaches the down position, it closes a normally open contact LS–10a of limit switch LS–10 which establishes a circuit from power line $L_1$ through a line 538, the contact LS–10a and a timer TDR–3 to the power line $L_2$. The duration of the cycle of the timer TDR–3 is selected to provide for adequate time for the air pressure in "Cyl. #4" to firmly press the individual tile pieces 202 downwardly onto the masses of resin 201, to flatten the rear surfaces of the resinous masses 201 against the belt 100 and to squeeze portions of those masses upwardly into the spaces between the individual pieces of tile 202. The time, however, is of relatively short duration, say, one or two seconds. When the timer TDR–3 completes its cycle it momentarily closes its normally open contact TDR–3a to deliver a pulse of current from the power line $L_1$ through a line 539 and then to the "Pos. II" coil of the solenoid valve V–4. This shifts the valve V–4 to admit air under pressure into the "Cyl. #4" to raise the platen 327.

Because the carriage 327 is in the "inboard" position, when the platen 327 reaches the "down" position, it not only closes LS–10 to initiate the cycle of TDR–3, as just described, but it also closes LS–11 to close the normally open contacts LS–11a and LS–11b (FIG. 31a). The contact LS–11a closes a circuit from the power line $L_1$ through a line 540 to a timer TDR–5 and thence to the power line $L_2$. The timer TDR–5 opens its normally closed contact TDR–5a which breaks a circuit through a line 541 from the power line $L_1$ and the coil of solenoid valve V–7 to the power line $L_2$. TDR–3 times out before TDR–5.

case nominally 4″ x 4″ ceramic tiles conventionally used on walls, is illustrated in FIGS. 32, 33 and 34.

Because of the weight of 4″ x 4″ wall tiles twelve of these tiles is a convenient number to include in each multiple unit assembly and, for ease and convenience in handling, packaging and shipping, it is desirable to arrange them in such assemblies measuring 3 tiles wide by 4 tiles long, or nominally 12″ wide and 16″ long. Because the assembly belt 100 of the machine disclosed in the drawings and described above is slightly more than two feet wide, it is convenient to simultaneously deposit two groups of twelve tiles each upon the assembly belt 100 in side by side relationship and thus to fabricate two series of multiple unit assemblies each comprising twelve pieces of tile.

In order to continuously fabricate such assemblies, an assembly board (not shown) similar to the assembly board 301 illustrated in FIGS. 25, 26 and 27 is employed. The difference between the assembly board 301 of FIGS. 25–27 and an assembly board employed for the production of 3 x 4 multiple unit assemblies of 4″ x 4″ tiles is in the dimensions of the cells on the assembly board which are defined by the thin metal strips 303. Instead of locating the strips 303 on 1″ centers as in the case of the assembly board 301, the thin metal strips 303 are located on 4″ centers so that each cell in the assembly board measures 4″ x 4″ and receives one of the nominally 4″ x 4″ pieces of tile, such as the pieces of tile 700 illustrated in FIG. 32. One such assembly board thus provides for the arrangement of twenty-four pieces 700 in each loading, and the tile transfer mechanism 300 of the machine deposits such a group of twenty-four tile pieces in each cycle of actuation. In FIG. 32, two twelve piece assemblies D and E are shown with a longitudinally extending center space between the assemblies.

In order that the assemblies each comprising twelve pieces of tile 700, are unified and yet maintained separate from adjacent, succeeding and preceding assemblies the location of the points of deposition of resinous masses 701 must be varied relative to the edges of the tile pieces 700 and depending upon whether or not the resinous masses 701 are centrally located with respect to a particular multiple unit assembly or located adjacent its longitudinal or transverse edges. As shown in FIG. 32, a single multiple unit assembly, for example the assembly indicated by the bracket D, requires the deposition of six centrally located resinous masses 701, each of which contacts the adjacent corners of four pieces of tile, as well as the deposition of other resin masses on centers spaced differently from each other. Six additional resin masses indicated by the reference numbers 701a are deposited in transverse alignment with the resin masses 701 but are spaced inwardly (say, ⅜″, or so) from the side edges of the assembly D a distance such that the masses 701 do not protrude laterally beyond the edges of the tile pieces 700 which they hold in place. Resinous masses 701 and 701a for a second assembly, indicated by the bracket E, are similarly spaced relative to each other and relative to tile pieces 700 of the assembly E on the assembly belt 100 along side of the assembly D.

In order to deposit the resinous masses 701 and 701a in each of three rows indicated as "Row 2," "Row 3" and "Row 4" in FIG. 32, a machine according to the invention is provided with eight transversely extending aligned resin pump nozzles 702 (see FIGS. 32 and 33). The pumps for all of the nozzles 702 are connected to a single air header for the simultaneous discharge of the eight resinous masses 701 and 701a upon each actuation of the pumps for the nozzle 702.

At the ends of each of the assemblies and upon the first, fifth, ninth, etc. strokes of the resinous mass depositing mechanism 200, two rows of resinous masses 701b and 701c are deposited. Each of the resinous masses 701b, for example in the row indicated by the legend "Row 5," is longitudinally aligned with the corresponding one of the masses 701 or 701a but spaced closer to these masses so that each of the masses 701b is spaced inwardly from the ends of the tile 700 and the end of the respective assembly, for example, the assembly D. Correspondingly, each of the masses 701c for example the row of masses 701c in the row bearing the legend "Row 1," is longitudinally aligned with the corresponding masses 701 and 701a and spaced inwardly from the ends of the tiles 700 at the end of the assembly D.

All of the resinous masses 701b and 701c are simultaneously deposited by nozzles 703 or 704, respectively, which extend across the machine in two rows of eight nozzles each on opposite sides of the row of nozzles 702. As can best be seen by reference to FIGURES 33 and 34, the row of nozzles 702 is so spaced as to deposit the transverse row of resinous masses 701 and the two outer rows of nozzles 703 and 704 are so spaced as to deposit the transverse rows of masses 701b and 701c. All of the pumps for the two rows of nozzles 703 and 704 are connected to a second air pressure header (not shown) so that they are simultaneously actuated to deposit resinous masses at each fourth stroke of the resin mass depositing mechanism 200.

It will be appreciated, of course, that by simple changes in the controls of the machine it would be possible to actuate the row of nozzles 702 continuously and upon each successive stroke of the resin mass depositing mechanism so that all of the resinous masses deposited would be in the positions occupied by the masses 701 or 701a and would produce a continuous sheet of tile pieces 700 in the same fashion as the continuous sheets of tile pieces 202 are produced in the mechanism illustrated in FIGS. 1–31. Similarly the lateral spacing of the nozzles 702, 703 and 704 may be adjusted so as to deposit resinous masses in even spacing across the assembly belt 100. By similarly changing the lateral spacing of the tile pieces 700 in the assembly board to uniformly space all six pieces in each transverse row, a continuous sheet of tiles 700, six tiles wide and as long as desired can be produced. By controlling the number of strokes between actuations of the two outer rows of nozzles 703 and 704, the length of either the two assemblies (three tiles wide) or a single assembly (six tiles wide) may be varied at will.

Adopting the same principle of shifting the position and actuation of the resin depositing nozzles so as to change the relative positions of the resinous masses 701, etc., on the assembly belt 100, it is possible to produce multiple unit assemblies of any width up to the maximum number of pieces of tile which can be simultaneously placed upon the belt 100, and up to any length from one row longitudinally to a continuous sheet as has been described.

For example, in FIG. 35, an arrangement is illustrated wherein a multiple unit assembly only one tile piece wide, is illustrated as being produced near one margin of the assembly belt 100, with a multiple unit assembly two or more tiles wide being simultaneously produced alongside. In such an arrangement, a longitudinally extending row of resinous masses 705 is deposited upon the belt 100 with the longitudinal spacing therebetween determined by the length of tile pieces 706, but the lateral position of the row of resinous masses 705 being such that each of the masses 705 contacts only two of the tile pieces 706 at about their mid-points. By similarly shifting over the alignment of a second row of resinous masses 705a, so that the masses 705a are deposited inwardly from the edges of tile pieces 706a, the tile pieces 706a are not connected to the tile pieces 706 in the single row assembly. FIGURE 35 also shows the deposition of resinous masses 705b in conventional placing where each of them contacts the corners of four pieces of title 706a or 706b.

Still other arrangements for the positioning of the resinous masses on the assembly belt so as to engage two or more pieces of tile are readily apparent wherein, for example, a plurality of multiple unit assemblies each one tile wide could be simultaneously produced, or a plurality of assemblies, some one tile wide, some two tiles wide, some three tiles wide, etc., could be simultaneously produced. Where modular sizes of pieces to be assembled are employed, as in the ceramic tile industry, it is often desirable to have multiple unit assemblies of a standard size such as the 12 x 24 assemblies of one inch tiles, or the 3 x 4 assemblies of four inch square tiles, and also to have cooperating multiple unit assemblies of lesser width in order to fill in areas whose dimensions do not correspond to multiples of the modular sizes of the basic multiple unit assemblies. It is also desirable to provide multiple unit assemblies, say only one piece wide, where trim pieces of contrasting color are to be employed in large areas upon which the basic multiple unit assemblies provide the majority of the surface.

While the particular tile pieces 202, 700 and 706 shown in the drawings have flat front and back faces, tile pieces of the particular size and style shown are merely illustrative of those pieces which may be assembled by the method and on the apparatus according to the invention. The front face of a piece of tile, or the like, which first is associated with other pieces in a group and then fabricated into an assembly need not be flat or planar. For example, the piece might have a raised border and a depressed center portion, as long as the uppermost surface of the raised border lies in the same plane and thus provides an effective front face for the piece. Similarly the effective back face of a piece of tile, or the like, might also be determined, for example, by a plurality of raised lugs, the surfaces of which would all lie in the same plane and thus form an effective back face for the tile piece. Pieces with effective front and back faces determined by raised borders or lugs may be assembled according to the invention, the front faces, for example, formed by the raised border, being pressed against the underside of the platen 328 and the effective back faces formed by elements such as lugs being pressed against the masses of resin 201, 701 and 705 and against the assembly belt 100 in the manner explained.

In the subjoined claims the following definitions of terms shall pertain:

(a) "Piece"—a single discrete one of a plurality of like, or complentary, units of ceramic tile, or the like, each of the units having spaced front and back faces, a face in either case being a flat surface or an effective flat surface determined by elements, such as lugs or raised borders, all lying in the same plane, the effective faces of the elements being parallel, each of the units having edge surfaces extending between the faces and all of the units having the same thickness within reasonable manufacturing tolerances; the plan shape of a piece being such that it can be assembled in adjacency with other like or complementary pieces to provide a sheet-like group or assembly.

(b) "Group"—a plurality of pieces of tile or the like, congregated or arranged in adjacency with each other in a pattern suitable for placing on a wall or floor, or other surface, regardless of the number or sizes of the pieces in the group.

(c) "Assembly"—a group or plurality of groups of pieces of tile or the like held together by discrete resinous masses in the manner disclosed and claimed in Macdonald et al. Patent No. 3,041,785.

(d) "Mass of resin"—a discrete, measured "drop" or "glob" of a resinous adhesive which is settable to provide means for retaining pieces of tile or the like in assemblies as taught in Macdonald Patent No. 3,041,785, and which has such viscosity and surface tension as to be suitable for handling and deposition in accordance with said patent and by means of apparatus such as that disclosed in the instant application.

Having described my invention, I claim:

1. A method for fabricating a multiple unit assembly of individual pieces in a desired pattern and with selected spacing therebetween, said method comprising, repetitively depositing a number of spaced parallel rows of masses settable resin on a planar assembly surface in a spaced pattern such that each of said masses is positioned for engaging portions of the rear faces and the adjacent edge surfaces of at least two adjacent ones of said pieces in said pattern and spacing, moving said planar assembly surface intermediate each deposition of said masses for moving said masses of resin thereon along a path normal to the said rows of masses of resin and to an assembly station, arranging a number of spaced parallel rows of said pieces on a generally flat surface with their front faces uppermost and in said pattern and spacing, the number of rows of said pieces being a whole number multiple of the number of rows of said masses of resin deposited on said assembly surface at each deposition thereof, engaging all of the front faces of the pieces in said group with a planar transfer surface upon the completion of a number of depositions of resinous masses equal to said whole number multiple, moving said planar transfer surface and the group of pieces engaged thereby to said assembly station in registry with said plurality of masses of resin and with the front faces spaced therefrom a distance only slightly greater than the maximum thickness of the pieces in said group, disengaging said planar transfer surface from said group of pieces and setting up the resin in said masses.

2. A method for fabricating a multiple unit assembly of individual pieces in a desired pattern and with selected spacing therebetween, said method comprising, arranging a group of said pieces comprising a plurality of rows on an assembly board with their front faces uppermost and in said pattern and spacing, depositing a plurality of masses of settable resin on the upper surface of a generally flat movable assembly belt in a spaced pattern such that each of said masses is positioned for engaging portions of the rear faces and the adjacent edge surfaces of at least two adjacent ones of said pieces in said group, engaging all of the front faces of the pieces in said group with the underside of a planar transfer platen, moving said assembly belt and said masses of resin thereon to an assembly station, holding said belt at said assembly station with its upper surface lying in a horizontal plane, moving said transfer platen and the group of pieces engaged thereby to said assembly station in a position overlying said assembly belt and with the pieces over and spaces therebetween in vertical registry with said masses of resin, moving said transfer platen downwardly into a position parallel to the upper surface of said assembly belt and spaced therefrom a distance only slightly greater than the maximum thickness of the pieces in said group for depositing said pieces on and for pressing the back faces of said pieces into said masses of resin, releasing said group of pieces from said transfer platen and leaving said pieces on said assembly, moving said assembly belt for conveying said deposited pieces away from said assembly station, and setting up the resin in said masses.

3. A method for fabricating a multiple unit assembly of individual pieces in a desired pattern and with selected spacing therebetween, said method comprising arranging a group of said pieces comprising a plurality of rows on an assembly board with their front faces uppermost and in said pattern and spacing, depositing a plurality of masses of settable resin on the upper surface of a generally flat, movable assembly belt in a spaced pattern such that each of said masses is positioned for engaging portions of the rear faces and the adjacent edge surfaces of at least two adjacent ones of said pieces in said group, engaging all of the front faces of the pieces in said group with the underside of a planar transfer platen, moving said assembly belt and said masses of resin thereon to an assembly station, holding said belt at said assembly station with its upper surface lying in a horizontal plane, moving said transfer platen and the group of pieces engaged thereby to said assembly station in a position overlying said assembly belt and with the pieces over and spaces therebetween in vertical registry with said masses of resin, moving said transfer platen downwardly into a position parallel to the upper surface of said assembly belt for depositing said pieces on said masses of resin and pressing said pieces into said masses of resin with a predetermined force and for a preselected period of time for forcing portions of said masses of resin between the edge surfaces of adjacent pieces and for flattening the backs of said masses of resin against said assembly belt, releasing said group of pieces from said transfer platen, moving said assembly belt and the masses of resin and deposited tile pieces thereon away from said assembly station, and setting up the resin in said masses.

4. Apparatus for fabricating a multiple unit assembly of individual pieces in a desired pattern and with selected spacing therebetween, said apparatus comprising, in combination, means for supporting a group of said pieces with their front faces uppermost and in said pattern and spacing, a planar assembly surface, means for depositing a plurality of masses of settable resin on said assembly surface in a spaced pattern such that each of said masses is positioned for engaging portions of the rear faces and the adjacent edge surfaces of at least two adjacent ones of said pieces in said pattern, means for moving said assembly surface and said masses of resin thereon to an assembly station and to a position beyond said assembly station, a planar transfer surface for engaging all of the front faces of the pieces in said group, means for engaging said transfer surface with the front faces of the pieces in said group, means for moving said transfer surface and the group of pieces engaged therewith to said assembly station in a position overlying said assembly surface and over and in registry with said plurality of masses of resin, means for moving said transfer surface into a position parallel to said assembly surface and spaced therefrom a distance only slightly greater than the maximum thickness of the pieces in said group for pressing said pieces into engagement with said masses of resin, means for releasing said group of pieces from said transfer surface, and heating apparatus for setting up the resin in said masses, said heating apparatus being located at said position beyond said assembly station.

5. Apparatus for fabricating a multiple unit assembly of individual pieces in a desired pattern and with selected spacing therebetween, said apparatus comprising, in combination, means for supporting a group of said pieces with their front faces uppermost and in said pattern and spacing, an assembly table having a planar surface at an assembly station, heating apparatus adjacent said assembly station, an assembly belt extending across said table at assembly station and past said heating apparatus, means for depositing a plurality of masses of settable resin on said assembly belt in a spaced pattern such that each of said masses is positioned for engaging portions of the rear faces and the adjacent edge surfaces of at least two adjacent ones of said pieces in said pattern, a transfer platen for engaging all of the front faces of the pieces in said group, means for moving said assembly belt for moving said masses of resin thereon to said assembly station, means for engaging the front faces of all of the pieces in said group with said transfer platen, means for moving said transfer platen and the group of pieces engaged therewith to said assembly station in a position overlying said assembly belt and over and in registry with said plurality of masses of resin, means for moving said transfer platen into a position parallel to the upper surface of said assembly belt and spaced therefrom at said assembly station a distance only slightly greater than the maximum thickness of the pieces in said group for pressing said pieces into engagement with said masses of resin, and means for releasing said group of pieces from said transfer platen, said belt moving means also moving said belt with said assembly of pieces thereon to and through said heating apparatus.

6. Apparatus for fabricating a multiple unit assembly of individual pieces in a desired pattern and with selected spacing therebetween, said apparatus comprising, in combination, a table having a planar surface at an assembly station, an oven adjacent said assembly station, a longitudinally movable assembly belt having a width at least as great as the width of said assembly and extending across said table past said assembly station and through said oven, means for depositing a plurality of masses of settable resin on said assembly belt in a spaced pattern such that each of said masses is positioned for engaging portions of the rear faces and the adacent edge surfaces of at least two adjacent ones of said pieces in said pattern, a carriage movable between an inboard position overlying said belt at said assembly station and an outboard position remote therefrom, means at said outboard position for supporting a group of said pieces arranged in said pattern and spacing, a transfer platen mounted on said carriage and having a planar surface and means for retaining said group of pieces with their upper surfaces all engaged with said planar surface, means for engaging said transfer platen with said group of pieces in said outboard position, means for moving said carriage to said inboard position with said group of pieces in a position overlying said assembly belt and over and in registry with said plurality of masses of resin, means for moving said transfer platen into a position parallel to the upper surface of said assembly belt and spaced therefrom a distance only slightly greater than the maximum thickness of the pieces in said group for pressing said pieces into engagement with said masses of resin, means for releasing said group of pieces from said transfer platen and means for moving said assembly belt for moving said masses of resin to said assembly station and for moving said masses of resin and said groups of pieces deposited thereon to and through said oven.

7. In an apparatus for fabricating a multiple unit assembly of individual pieces in a desired pattern and with selected spacing therebetween, which apparatus has an assembly station, and an oven adjacent such station, an assembly belt leading to such assembly station and to said oven, means for depositing a plurality of masses of settable resin on said assembly belt in a spaced pattern such that each of said masses is positioned for engaging portions of the rear faces and the adjacent edge surfaces of at least two adjacent ones of said pieces in said pattern and transfer means for delivering a group of pieces arranged in said pattern and spacing to said assembly station with their front faces uppermost and into engagement with said plurality of masses of resin on said assembly belt, the improvement comprising, in combination, a substantially planar table extending beneath and supporting said assembly belt at such assembly station, a pair of rollers engaged with said belt at opposite ends of said apparatus for guiding said belt in a linear path over said table at such assembly station and through said oven, a belt feeding clamp comprising a pair of opposed cooperating members between which said belt extends, means for alternately closing and opening said belt feeding clamp for gripping and releasing said belt, a belt holding clamp comprising a pair of opposed cooperating members between which said belt extends, means for alternately closing and opening said belt holding clamp for gripping and releasing said belt, guide means mounting said belt feeding clamp for measured reciprocatory, feeding and retracting movements thereof in a path parallel to the direction of desired movement of said belt, reciprocating means for moving said belt feeding clamp on said guide means, control means responsive to the completion of a deposition of said resinous masses on said belt for simultaneously opening said belt feeding clamp and closing said belt holding clamp, control means responsive to the opening of said belt feeding clamp for actuating said reciprocating means for retracting said belt feeding clamp, control means responsive to the completion of a retracting movement of said belt feeding clamp for simultaneously closing said belt feeding clamp and opening said belt holding clamp, control means responsive to the closing of said belt feeding clamp for actuating said reciprocating means for feeding said belt feeding clamp, control means responsive to the completion of each feeding movement of said belt feeding clamp for actuating said resin depositing means, and control means responsive to a preselected number of feeding movements of said belt feeding clamp for actuating said transfer means.

8. In an apparatus according to claim 7, the improvement comprising, in combination, resin depositing means for depositing a predetermined number of transversely extending, longitudinally spaced rows of spaced masses of resin on said assembly belt upon each actuation thereof, belt feeding means for feeding said belt longitudinally upon each actuation thereof a distance equal to the longitudial space between adjacent rows multiplied by said predetermined number of rows of said resin masses and transfer means for delivering a group of pieces consisting of a number of transversely extending rows of spaced pieces equal in number to a whole number multiple of the number of transversely extending rows of said resin masses, the number of pieces in each row thereof being equal to one less than the number of resin masses in each row thereof.

9. In an apparatus for fabricating a multiple unit assembly of individual pieces in a desired pattern and with selected spacing therebetween, said apparatus comprising, a longitudinally movable assembly belt, mechanism for sequentially depositing on said belt transversely extending rows of discrete masses of settable resin in such spacing and pattern that each of said masses is positioned for engaging portions of the rear faces and of the adjacent edge surfaces of at least two adjacent ones of said pieces in said pattern, belt feeding mechanism for moving said belt and the masses of resin thereon to an assembly station, and a transfer mechanism, said transfer mechanism comprising a carriage movable between an inboard position overlying said belt at said assembly station and an outboard position spaced laterally from said belt, means for moving said carriage between said positions, a transfer platen having a planar bottom surface, said platen being mounted on said carriage for movement between a lower position with its surface at a level spaced above the upper surface of said belt a distance only slightly greater than the maximum thickness of said pieces and an upper position with its surface spaced at a level above the upper surface of said belt a distance greater than the combined thickness of said pieces and the height of said masses of resin, means for moving said platen between said upper and lower positions, means at said outboard position for supporting a group of said pieces with their front faces uppermost, and at a level substantially the same as the surface of said platen when said platen is at its lower position, said group consisting of at least one row of pieces corresponding in spacing and pattern with said rows of masses of resin, releasable means for said platen for engaging and retaining said group of pieces with their front faces against the surface of said platen, sequence control means for actuating said carriage moving means upon arrival of said platen at upper position, control means for actuating said platen moving means for moving said platen to lower position upon arrival of said carriage at the outboard position of said carriage and for then returning said platen to upper position, control means for retaining said group of pieces on said platen upon departure of said platen from lower position when said carriage is in outboard position and for releasing said pieces from said platen prior to departure of said platen from lower position when said carriage is in inboard position overlying said belt, and cooperative control means responsive to the completion of a determined number of belt feeding movements and to arrival of said carriage with a group of said pieces at inboard position overlying said belt for actuating said platen moving means for moving said platen to lower position for pressing said pieces onto said masses of resin.

10. An apparatus according to claim 9 in which the platen has an interior chamber and the bottom surface of said platen consists of a plate having an orifice therethrough leading from said chamber for each of said pieces to be transferred thereby, and in which the releasable means for said platen for engaging, retaining and releasing the group of pieces comprises, a vacuum line, a valve for alternately connecting said vacuum line to said chamber and to atmosphere, and means actuated in sequence with the several control means for shifting said valve.

11. An apparatus for fabricating a multiple unit assembly of individual pieces in a desired pattern and with selected spacing therebetween, said apparatus comprising, a longitudinally movable assembly belt having a planar upper surface, mechanism for sequentially depositing on said belt a continuous series of transversely extending, longitudinally spaced rows of discrete masses of settable resin, the masses in each of such rows being so spaced that each of said masses is positioned on said belt for engagement with the corners of the rear faces and portions of the adjacent edge surfaces of two adjacent ones of said pieces in such row and the neighboring rear faces and edge surfaces of two pieces in the adjacent one of such rows of pieces, belt feeding mechanism for moving said belt and the masses of resin thereon to an assembly station, a transfer mechanism for sequentially depositing a series of transversely extending, longitudinally spaced rows of such pieces on and for pressing such pieces against said resinous masses with their front faces all lying in a plane parallel to and spaced from the plane of said assembly belt a distance only slightly greater than the maximum thickness of said pieces, and means for moving said belt.

12. An apparatus according to claim 11 in which said resin depositing mechanism comprises three transversely extending, longitudinally spaced rows of individual resin mass depositing pumps and sequence means for selectively actuating one of said rows of pumps and two of said rows of pumps, for depositing one row of masses on said belt in certain cycles and two spaced rows of said masses in other cycles.

13. An apparatus according to claim 11 in which said resin depositing mechanism comprises more than one transversely extending, longitudinally spaced row of individual resin mass depositing pumps and means for simultaneously actuating all of said pumps for depositing more than one row of said masses on said belt.

14. An apparatus according to claim 13 in which said transfer mechanism comprises a planar platen for simultaneously transferring and depositing a number of complete, transversely extending, longitudinally spaced rows of pieces onto said rows of resin masses, the number of rows of pieces being a multiple of the number of rows of resin masses.

15. An apparatus according to claim 13 and sequence mechanism for actuating the resin depositing mechanism intermediate each movement of the belt and for actuating the transfer mechanism after each multiple number of movements of said belt, and in which the belt moving means moves the belt a longitudinal distance equal to the space between adjacent rows multipled by the number of rows of resin masses deposited upon each actuation of said resin depositing mechanism.

16. An apparatus for fabricating a multiple unit assembly of individual pieces in a desired pattern and with selected spacing therebetween, said apparatus comprising, a longitudinally movable assembly belt having a planar upper surface, mechanism for sequentially depositing on said belt a series of transversely extending, longitudinally spaced rows of discrete masses of settable resin, some of the masses in such rows being so spaced that each of said masses is positioned on said belt for engagement with the corners of the rear faces and portions of the adjacent edge surfaces of two adjacent ones of said pieces in such row and the neighboring rear faces and edge surfaces of two pieces in the adjacent one of such rows of pieces and some of the masses in such rows being so spaced that each of said masses is positioned on said belt for engagement with portions of the rear faces and portions of the adjacent edge surfaces of only two of said pieces, belt feeding mechanism for moving said belt and the masses of resin thereon to an assembly station, a transfer mechanism for sequentially depositing a series of transversely extending, longitudinally spaced rows of such pieces on and for pressing such pieces against said resinous masses with their front faces all lying in a plane parallel to and spaced from the plane of said assembly belt a distance only slightly greater than the maximum thickness of said pieces, and means for moving said belt.

17. An apparatus for fabricating a multiple unit assembly of individual pieces arranged in a row one piece wide and with selected spacing therebetween, said apparatus comprising, a longitudinally movable assembly belt having a planar upper surface, mechanism for sequentially depositing on said belt a row of longitudinally spaced discrete masses of settable resin, the masses in such row being so spaced that each of said masses is positioned on said belt for engagement with portions of the rear faces near the edges and portions of the adjacent edge surfaces of two adjacent ones of said pieces in such row, belt feeding mechanism for moving said belt and the masses of resin thereon to an assembly station, a transfer mechanism for sequentially depositing a longitudinally spaced and aligned group of such pieces on and for pressing such pieces against said resinous masses with their front faces all lying in a plane parallel to and spaced from the plane of said assembly belt a distance only slightly greater than the maximum thickness of said pieces, means for moving said belt and means for setting up said resinous masses.

References Cited

UNITED STATES PATENTS 3,185,748   5/1965   Macdonald et al. ____ 264—261

EARL M. BERGERT *Primary Examiner.*

M. L. KATZ, *Assistant Examiner.*

UNITED STATES PATENT OFFICE
CERTIFICATE OF CORRECTION

Patent No. 3,322,591　　　　　　　　　　　　　　　　May 30, 1967

Robert B. Cleverly

It is hereby certified that error appears in the above numbered patent requiring correction and that the said Letters Patent should read as corrected below.

Column 1, line 19, strike out "the", second occurrence; column 2, line 4, for "said" read -- say --; line 9, for "tiles" read -- tile --; line 33, after "pieces" insert -- are --; column 3, line 64, for "plane" read -- plan --; column 10, line 9, for "233" read -- 233a --; column 13, line 1, after "Four" insert -- hangers --; line 34, for "cylinders" read -- cylinder --; column 18, line 13, for "value" read -- valve --; columns 19 and 20, in the chart, last column, line 14 thereof, for "320" read -- 327 --; same column line 21, for "II" read -- I --; same chart, second column, line 9 thereof, for "328" read -- 327 --; same chart, last column, line 4 from the bottom, for "Sences" read -- Senses --; same line 4, for "327" read -- 328 --; column 21, line 22, for "recludes" read -- precludes --; column 23, line 38, after "gizing" insert -- the --; column 25, line 58, for "37" read -- 327 --; line 64, for "contacts" read -- contact --; line 65, strike out "for"; line 67, for "capaitor" read -- capacitor --; column 26, line 36, for "piece" read -- pieces --; line 47, for "cirriage" read -- carriage --; line 54, for "R-5 of relay" read -- R-5a of relay R --; line 72, for "The" read -- This --; column 27, line 32, for "content" read -- contact --; column 28, line 14, for "unusal" read -- unusual --; line 37, for "contacts" read -- contact --; column 30, line 71, for "title" read -- tile --; column 31, line 44, for "complentary" read -- complementary --; column 32, line 2, after "masses" insert -- of --; line 54, after "assembly", first occurrence, insert -- belt --; column 35, lines 19 and 20, for "longitudial" read -- longitudinal --; column 19, line 73, column 23, line 36, column 24, lines 4, 15, 38, 40, 45, 63 and 65, column 25, lines 2, 7, 17, 18, 26, 33, 36, 48, 66 and 73, column 26, lines 1, 14, 15, 26, 27, 32, 35, 37, 38, 40, 42, line 57, first occurrence, and line 70, column 27, lines 1, 4, 11, 43, 45, 53, 54, 55, 59, 60, 63 and 66, column 28, lines 2, 3, 6, second occurrence, 12, 19, 20, 26, 35, 43 and 58, for "327", each occurrence, read -- 328 --.

Signed and sealed this 10th day of September 1968.

(SEAL)
Attest:

EDWARD M. FLETCHER, JR.　　　　　　　　　　EDWARD J. BRENNER
Attesting Officer　　　　　　　　　　　　Commissioner of Patents

UNITED STATES PATENT OFFICE
CERTIFICATE OF CORRECTION

Patent No. 3,322,591                                                     May 30, 1967

Robert B. Cleverly

It is hereby certified that error appears in the above numbered patent requiring correction and that the said Letters Patent should read as corrected below.

Column 1, line 19, strike out "the", second occurrence; column 2, line 4, for "said" read -- say --; line 9, for "tiles" read -- tile --; line 33, after "pieces" insert -- are --; column 3, line 64, for "plane" read -- plan --; column 10, line 9, for "233" read -- 233a --; column 13, line 1, after "Four" insert -- hangers --; line 34, for "cylinders" read -- cylinder --; column 18, line 13, for "value" read -- valve --; columns 19 and 20, in the chart, last column, line 14 thereof, for "320" read -- 327 --; same column line 21, for "II" read -- I --; same chart, second column, line 9 thereof, for "328" read -- 327 --; same chart, last column, line 4 from the bottom, for "Sences" read -- Senses --; same line 4, for "327" read -- 328 --; column 21, line 22, for "recludes" read -- precludes --; column 23, line 38, after "gizing" insert -- the --; column 25, line 58, for "37" read -- 327 --; line 64, for "contacts" read -- contact --; line 65, strike out "for"; line 67, for "capaitor" read -- capacitor --; column 26, line 36, for "piece" read -- pieces --; line 47, for "cirriage" read -- carriage --; line 54, for "R-5 of relay" read -- R-5a of relay R --; line 72, for "The" read -- This --; column 27, line 32, for "content" read -- contact --; column 28, line 14, for "unusal" read -- unusual --; line 37, for "contacts" read -- contact --; column 30, line 71, for "title" read -- tile --; column 31, line 44, for "complentary" read -- complementary --; column 32, line 2, after "masses" insert -- of --; line 54, after "assembly", first occurrence, insert -- belt --; column 35, lines 19 and 20, for "longitudial" read -- longitudinal --; column 19, line 73, column 23, line 36, column 24, lines 4, 15, 38, 40, 45, 63 and 65, column 25, lines 2, 7, 17, 18, 26, 33, 36, 48, 66 and 73, column 26, lines 1, 14, 15, 26, 27, 32, 35, 37, 38, 40, 42, line 57, first occurrence, and line 70, column 27, lines 1, 4, 11, 43, 45, 53, 54, 55, 59, 60, 63 and 66, column 28, lines 2, 3, 6, second occurrence, 12, 19, 20, 26, 35, 43 and 58, for "327", each occurrence, read -- 328 --.

Signed and sealed this 10th day of September 1968.

(SEAL)
Attest:

EDWARD M. FLETCHER, JR.
Attesting Officer

EDWARD J. BRENNER
                                                                      Commissioner of Patents